US011201707B2

(12) United States Patent
Chen et al.

(10) Patent No.: US 11,201,707 B2
(45) Date of Patent: *Dec. 14, 2021

(54) SECURED INDEPENDENT HOSTED PAYLOAD OPERATIONS

(71) Applicant: The Boeing Company, Chicago, IL (US)

(72) Inventors: Yi-Feng James Chen, Irvine, CA (US); Robert J. Winig, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/724,091

(22) Filed: Oct. 3, 2017

(65) Prior Publication Data

US 2018/0254866 A1 Sep. 6, 2018

Related U.S. Application Data

(63) Continuation-in-part of application No. 15/451,291, filed on Mar. 6, 2017, now Pat. No. 10,530,751, and
(Continued)

(51) Int. Cl.
*H04L 5/00* (2006.01)
*H04B 7/185* (2006.01)
*G05D 1/00* (2006.01)

(52) U.S. Cl.
CPC ......... *H04L 5/0046* (2013.01); *G05D 1/0022* (2013.01); *H04B 7/18515* (2013.01); *H04B 7/18526* (2013.01); *H04B 7/18584* (2013.01)

(58) Field of Classification Search
None
See application file for complete search history.

(56) References Cited

U.S. PATENT DOCUMENTS 5,701,603 A  12/1997 Norimatsu
5,963,650 A  10/1999 Simionescu et al.
(Continued)

FOREIGN PATENT DOCUMENTS

CN  1512711 A  7/2004
CN  101304408 A  11/2008
(Continued)

OTHER PUBLICATIONS

Halimi et al., "Applicability of Asymmetric Cryptography for Space Data Links Security Systems", 2016 IEEE Aerospace Conference, Mar. 5, 2016, pp. 1-13, IEEE.
(Continued)

*Primary Examiner* — Mohammad S Adhami
(74) *Attorney, Agent, or Firm* — Haynes and Boone, LLP

(57) ABSTRACT

Systems, methods, and apparatus for secured independent hosted payload operations are disclosed. In one or more embodiments, a disclosed method for payload operations comprises receiving, by a command receiver on a vehicle, host commands from a host satellite operations center (SOC). The method further comprises commanding a hosted payload on or off according to the host commands. Also, the method comprises reconfiguring a host payload according to the host commands. In addition, the method comprises transmitting, by a host payload antenna, host user data to a host user antenna. Additionally, the method comprises receiving, by a hosted payload antenna on the vehicle, hosted commands from a hosted payload (HoP) operation center (HOC). Also, the method comprises reconfiguring the hosted payload according to the hosted commands. Further, the method comprises transmitting, by the hosted payload antenna, hosted user data to a hosted user antenna.

22 Claims, 28 Drawing Sheets

Figure 1:
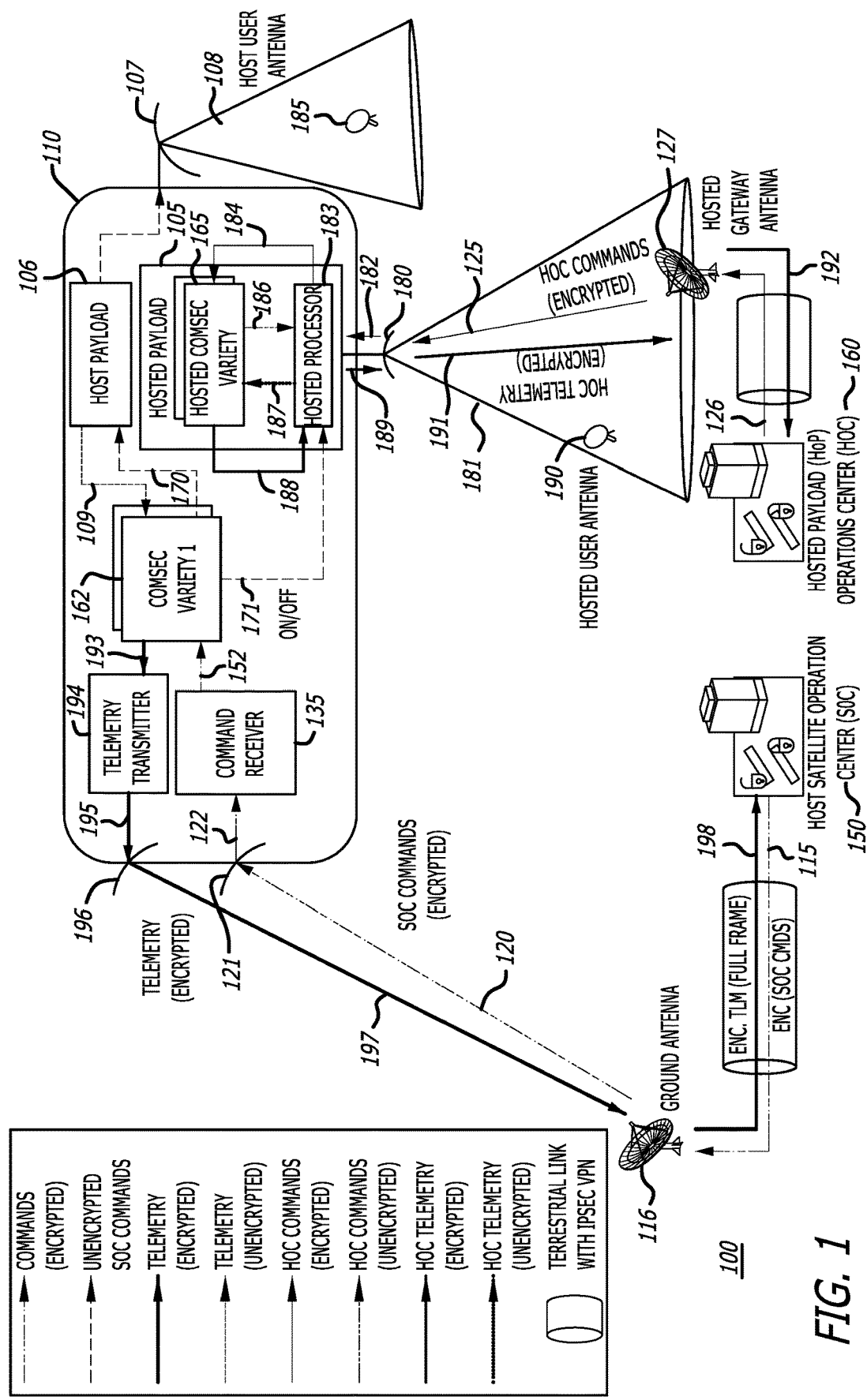
Figure 2A:
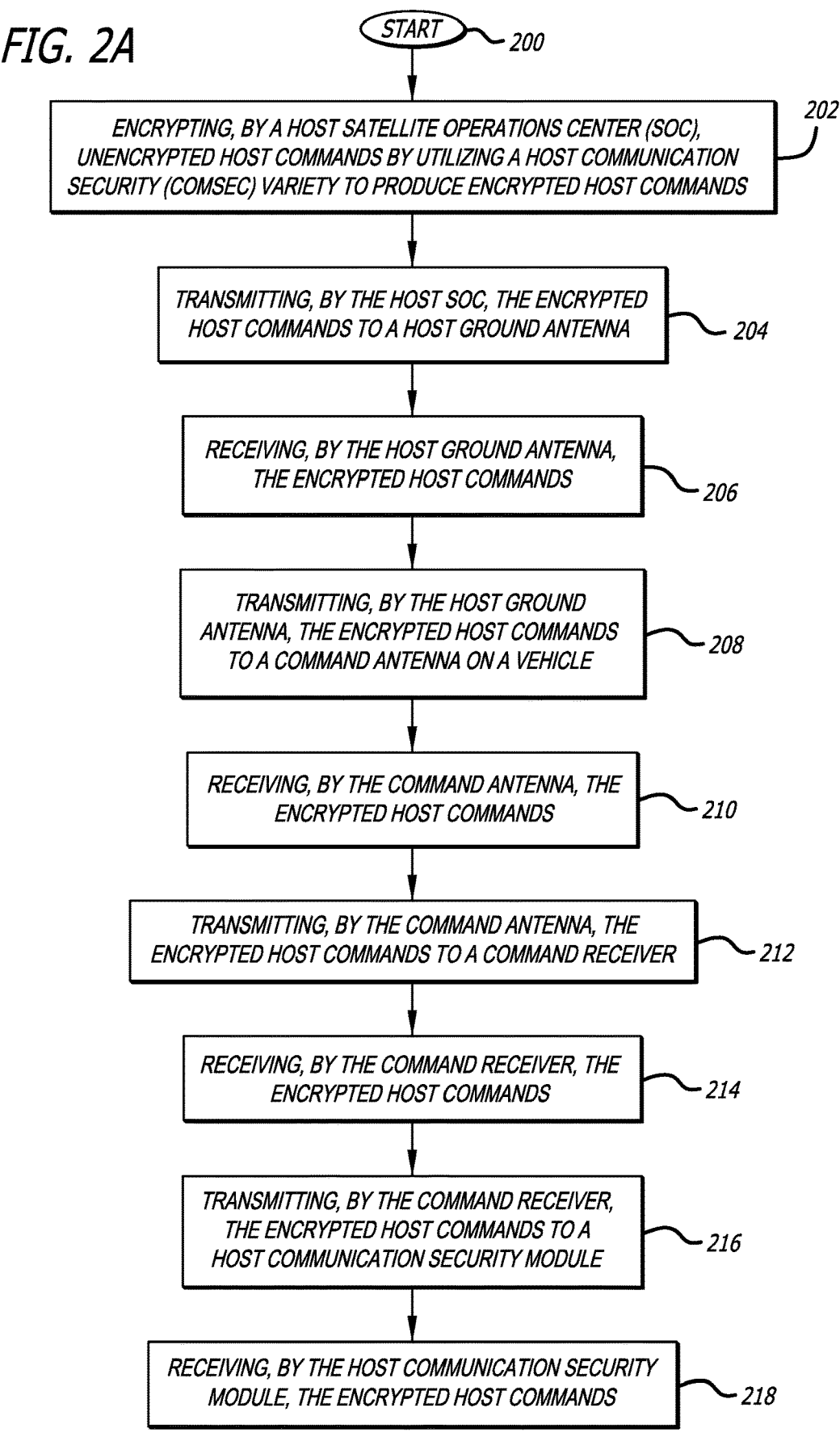
Figure 2B:
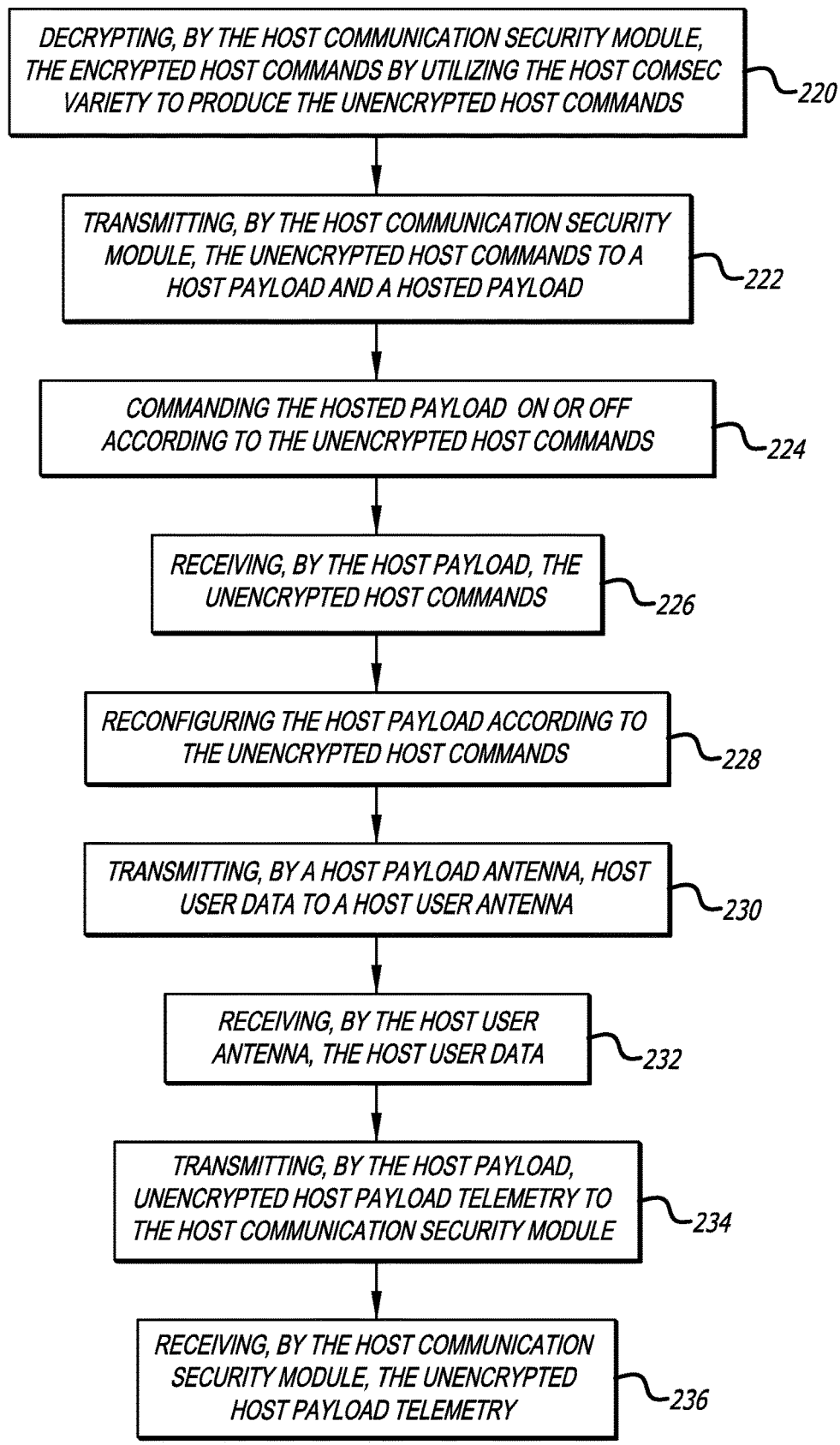
Figure 2C:
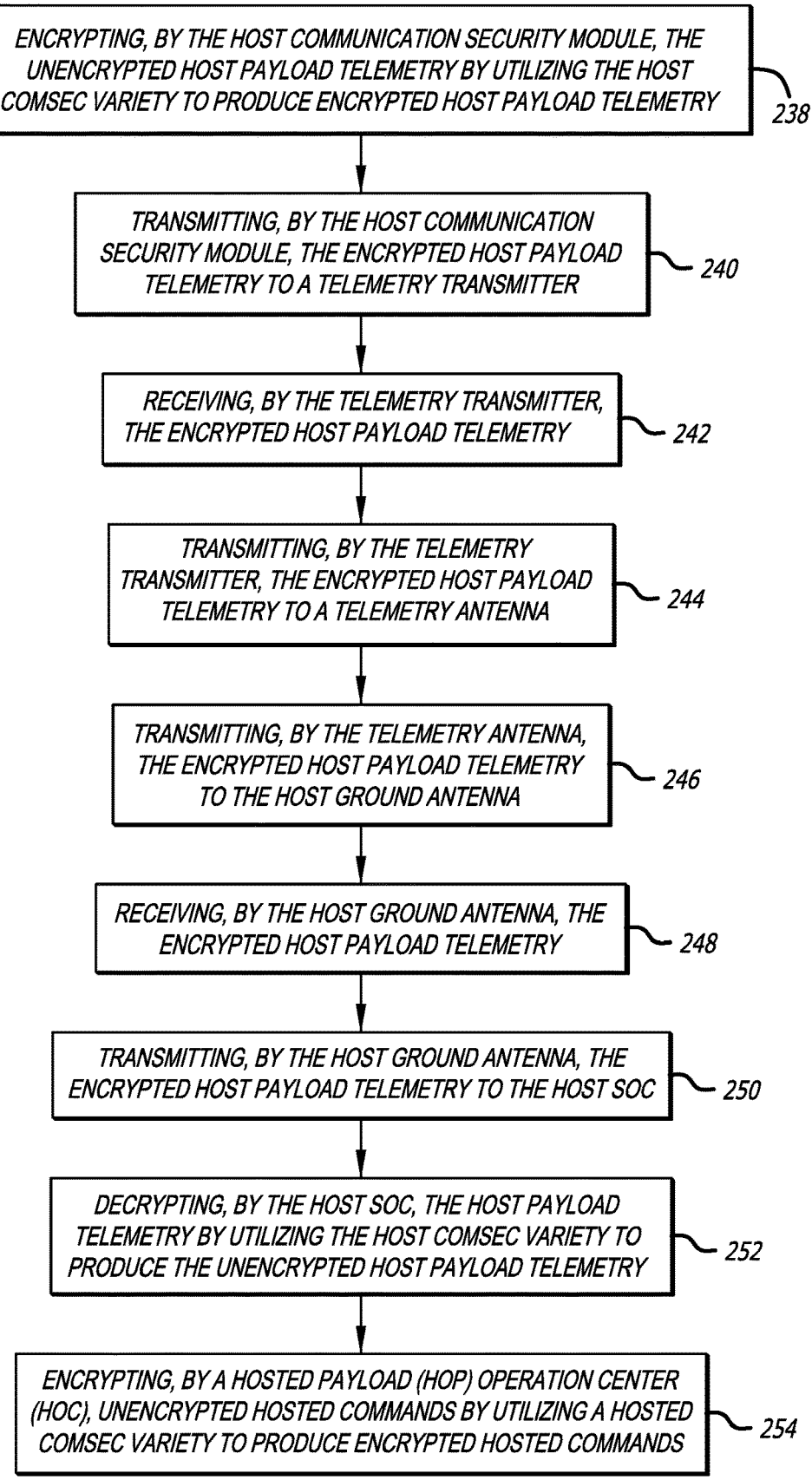
Figure 2D:
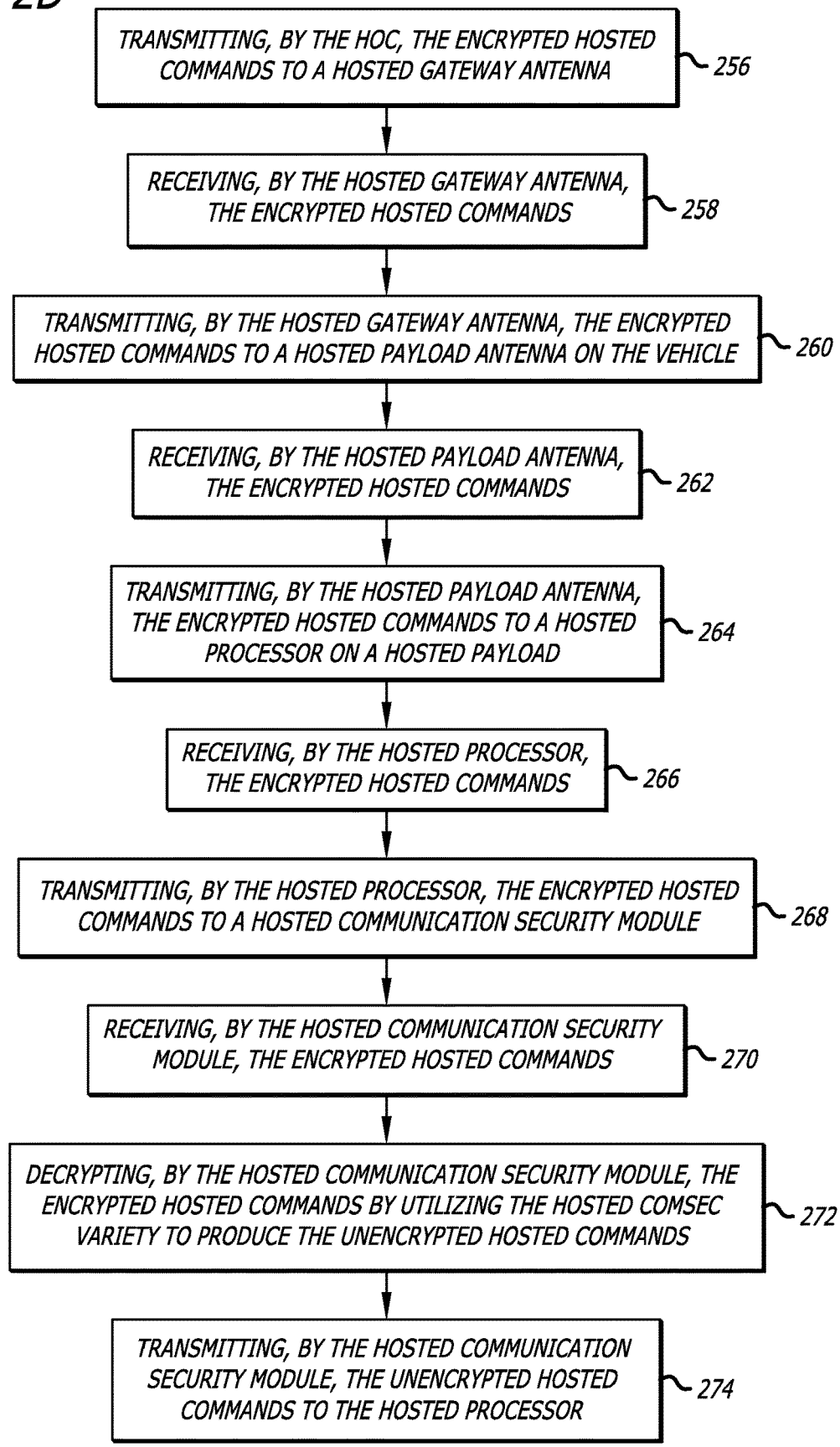
Figure 2E:
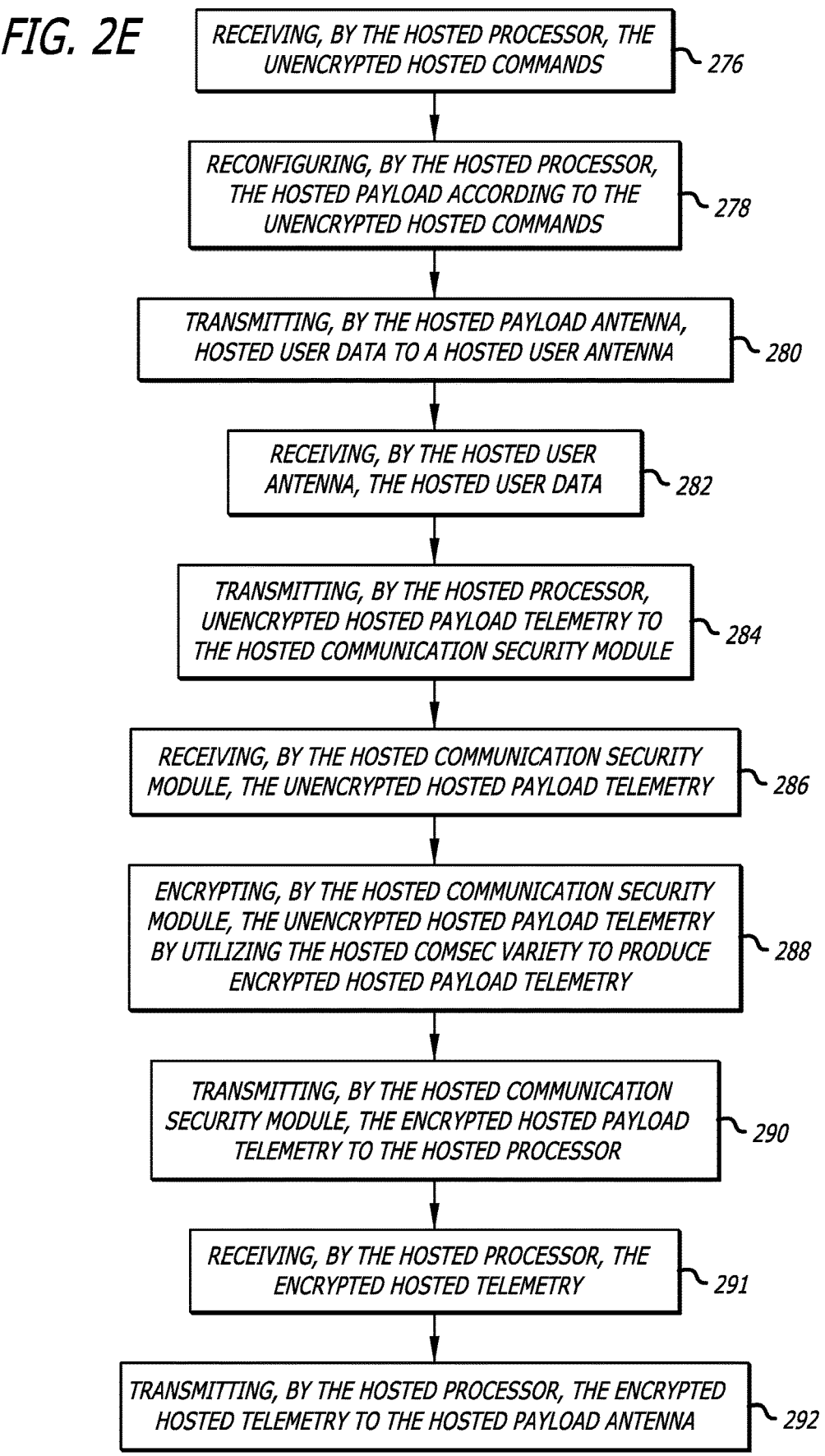
Figure 2F:
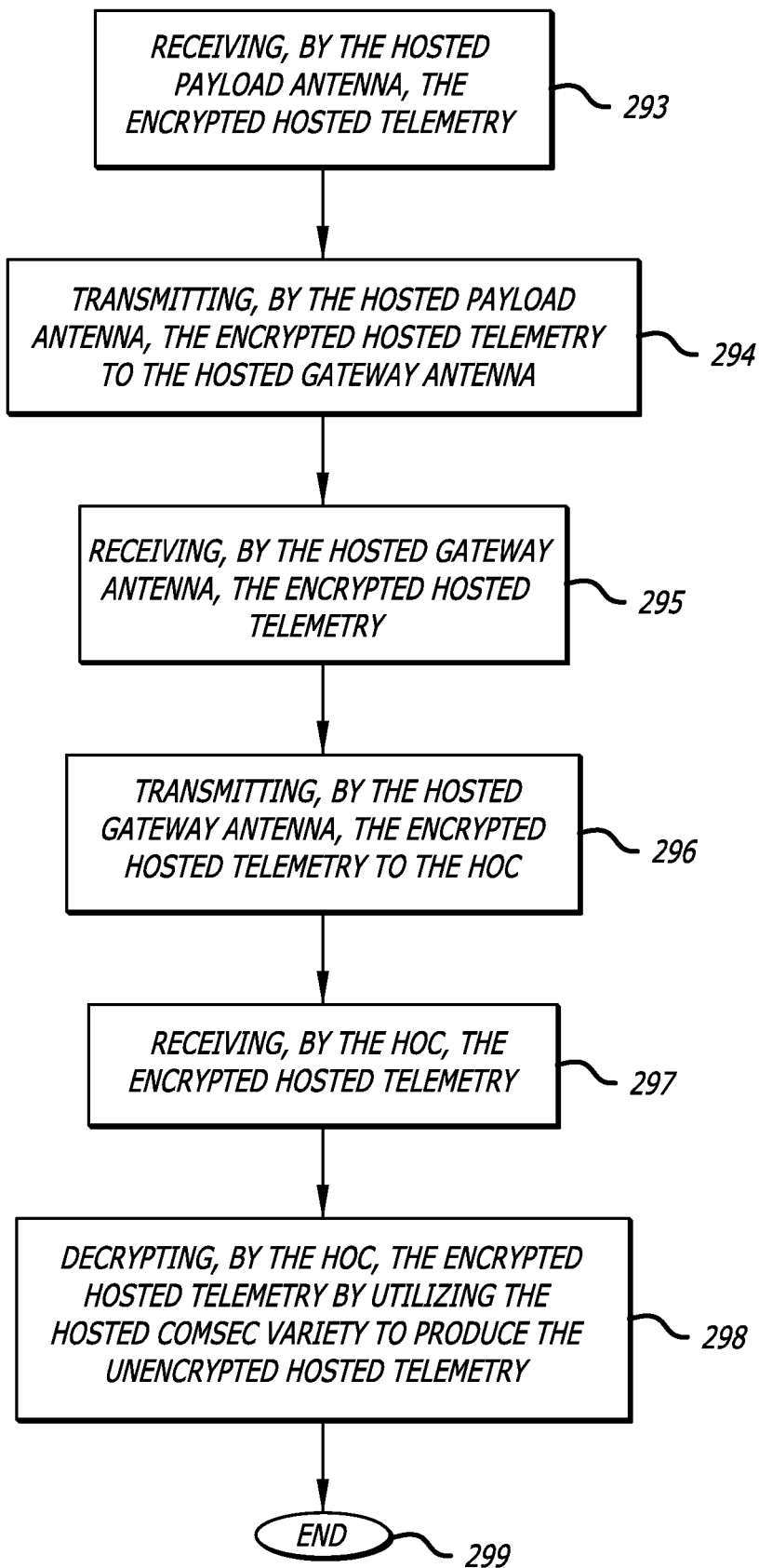

Related U.S. Application Data a continuation-in-part of application No. 15/451,277, filed on Mar. 6, 2017, and a continuation-in-part of application No. 15/451,267, filed on Mar. 6, 2017, now Pat. No. 10,419,403, and a continuation-in-part of application No. 15/451,242, filed on Mar. 6, 2017, now Pat. No. 11,101,879, and a continuation-in-part of application No. 15/451,205, filed on Mar. 6, 2017, now Pat. No. 10,728,221, said application No. 15/451,291 is a continuation of application No. 15/451,224, filed on Mar. 6, 2017, now Pat. No. 10,673,825, application No. 15/724,091, which is a continuation of application No. 15/451,183, filed on Mar. 6, 2017, now Pat. No. 10,165,438.

(56) References Cited

U.S. PATENT DOCUMENTS

| | | | |
|---|---|---|---|
| 6,684,182 | B1 | 1/2004 | Gold et al. |
| 7,542,716 | B2 | 6/2009 | Bell et al. |
| 8,200,149 | B1 | 6/2012 | Chen |
| 8,521,427 | B1* | 8/2013 | Luyks .................... G01C 21/00 |
| | | | 340/426.2 |
| 8,614,945 | B2 | 12/2013 | Brunnenmeyer |
| 8,873,456 | B2 | 10/2014 | Krikorian et al. |
| 9,042,295 | B1 | 5/2015 | Balter et al. |
| 9,337,918 | B2 | 5/2016 | Bell et al. |
| 2002/0104920 | A1 | 8/2002 | Thompson et al. |
| 2003/0017827 | A1 | 1/2003 | Ciaburro et al. |
| 2007/0133528 | A1 | 6/2007 | Jin et al. |
| 2007/0140449 | A1 | 6/2007 | Whitfield et al. |
| 2008/0055151 | A1 | 3/2008 | Hudson et al. |
| 2008/0149776 | A1 | 6/2008 | Benedict |
| 2008/0149777 | A1* | 6/2008 | Benedict ................ B64G 1/641 |
| | | | 244/158.1 |
| 2008/0153414 | A1 | 6/2008 | Ho et al. |
| 2009/0052369 | A1* | 2/2009 | Atkinson ........... H04B 7/18521 |
| | | | 370/316 |
| 2013/0046422 | A1 | 2/2013 | Cabos |
| 2013/0046819 | A1 | 2/2013 | Bocimea |
| 2013/0077788 | A1* | 3/2013 | Blanchard .......... H04B 7/18593 |
| | | | 380/255 |
| 2013/0137365 | A1 | 5/2013 | Taylor |
| 2014/0099986 | A1 | 4/2014 | Kikuchi et al. |
| 2014/0119385 | A1 | 5/2014 | Hoffmeyer et al. |
| 2014/0303813 | A1 | 10/2014 | Ihns |
| 2015/0162955 | A1* | 6/2015 | Burch ................... H04B 5/0031 |
| | | | 398/118 |
| 2015/0203213 | A1 | 7/2015 | Levien et al. |
| 2016/0087713 | A1 | 3/2016 | Oderman et al. |
| 2017/0012697 | A1* | 1/2017 | Gong .................... H04W 40/02 |
| 2017/0041065 | A1* | 2/2017 | Goettle, Jr. ........... H03F 1/0261 |
| 2017/0134103 | A1 | 5/2017 | Tessandori et al. |
| 2018/0254822 | A1 | 9/2018 | Miller et al. |
| 2018/0254823 | A1 | 9/2018 | Miller et al. |
| 2018/0255024 | A1* | 9/2018 | Chen ................... H04L 63/0428 |
| 2018/0255025 | A1* | 9/2018 | Chen ................... H04L 63/0428 |
| 2018/0255026 | A1* | 9/2018 | Winig ................ H04B 7/18515 |
| 2018/0255027 | A1* | 9/2018 | Winig ................. H04L 63/0428 |
| 2018/0255455 | A1* | 9/2018 | Winig .................... H04W 12/02 |
| 2019/0082319 | A1 | 3/2019 | Chen et al. |
| 2020/0244631 | A1* | 7/2020 | Chen ................. H04W 12/0017 |

FOREIGN PATENT DOCUMENTS

| | | |
|---|---|---|
| CN | 101305530 A | 11/2008 |
| CN | 103001952 A | 3/2013 |
| CN | 103368638 A | 10/2013 |
| CN | 103747023 A | 4/2014 |
| CN | 104221412 A | 12/2014 |
| CN | 104281449 A | 1/2015 |
| CN | 104702332 A | 6/2015 |
| CN | 105549464 A | 5/2016 |
| CN | 105894773 A | 8/2016 |
| EP | 1085680 | 3/2001 |
| EP | 1936833 | 6/2008 |
| EP | 1950893 A1 | 7/2008 |
| EP | 2518821 A1 | 10/2012 |
| EP | 2573956 | 3/2013 |
| EP | 2881331 A1 | 6/2015 |
| EP | 3373476 | 9/2018 |
| JP | 2000166046 | 6/2000 |
| RU | 2600564 C2 | 10/2016 |
| WO | WO 1996/032568 | 10/1996 |
| WO | WO 1999/040693 | 8/1999 |
| WO | WO 2013/130812 | 9/2013 |

OTHER PUBLICATIONS

Pang et al., "CHIRP Program Lessons Learned From the Contractor Program Management Team Perspective", 2012 IEEE Aerospace Conference, Mar. 3, 2012, pp. 1-7, XP032230091, DOI: 10.1109/AERO.2012.6187278, ISBN: 978-1-4577-0556-4, IEEE.

Office Action dated Mar. 3, 2021 from related Russian application No. 2018103722/07(005373), 14 pages, original and English translation.

First Office Action dated Apr. 19, 2021, from related Chinese Application No. 2018101788763, original and translation, 12 pages.

First Office Action dated Apr. 30, 2021, from related Chinese Application No. 2018101788091, original and translation, 22 pages.

Examination Search Report dated May 12, 2021, from related Canadian Application No. 2,993,412, 3 pages.

First Office Action dated Apr. 16, 2021 from related Chinese Patent Application No. 2018101911753, original and translation, 20 pages.

* cited by examiner

SECURED INDEPENDENT HOSTED PAYLOAD OPERATIONS

CROSS-REFERENCE TO RELATED APPLICATIONS

This application is a Continuation-in-Part application of, and claims priority to and the benefit of, (1) U.S. patent application Ser. No. 15/451,291, filed Mar. 6, 2017; (2) U.S. patent application Ser. No. 15/451,277, filed Mar. 6, 2017; (3) U.S. patent application Ser. No. 15/451,267, filed Mar. 6, 2017; (4) U.S. patent application Ser. No. 15/451,242, filed Mar. 6, 2017; (5) U.S. patent application Ser. No. 15/451,205, filed Mar. 6, 2017; (6) U.S. patent application Ser. No. 15/451,224, filed Mar. 6, 2017; and (7) U.S. patent application Ser. No. 15/451,183, filed Mar. 6, 2017; the entire disclosures of which are expressly incorporated by reference herein.

FIELD

The present disclosure relates to payload operations. In particular, it relates to secured independent hosted payload operations.

BACKGROUND

Currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

As such, there is a need for an improved payload operations design that allows for privacy in the allocation of resources on the payload.

SUMMARY

The present disclosure relates to a method, system, and apparatus for secured independent hosted payload operations. In one or more embodiments, a method for payload operations comprises transmitting, by a host satellite operations center (SOC), encrypted host commands, where the encrypted host commands are encrypted utilizing a host communication security (COMSEC) variety. The method further comprises receiving, by a command receiver on a vehicle, the encrypted host commands. Also, the method comprises decrypting, by a host communication security module, the encrypted host commands by utilizing the host COMSEC variety to produce unencrypted host commands. In addition, the method comprises commanding a hosted payload on or off according to the unencrypted host commands. Additionally, the method comprises reconfiguring a host payload according to the unencrypted host commands. Also, the method comprises transmitting, by a host payload antenna, host user data to a host user antenna. In addition, the method comprises encrypting, by the host communication security module, unencrypted host payload telemetry by utilizing the host COMSEC variety to produce encrypted host payload telemetry. Additionally, the method comprises transmitting, by a telemetry transmitter, the encrypted host payload telemetry. Also, the method comprises decrypting, by the host SOC, the host payload telemetry by utilizing the host COMSEC variety to produce the unencrypted host payload telemetry. In addition, the method comprises encrypting, by a hosted payload (HoP) operation center (HOC), unencrypted hosted commands by utilizing a hosted COMSEC variety to produce encrypted hosted commands.

Also, the method comprises transmitting, by a hosted payload (HoP) operation center (HOC), encrypted hosted commands, where the encrypted hosted commands are encrypted utilizing a hosted COMSEC variety. Additionally, the method comprises receiving, by a hosted payload antenna on the vehicle, the encrypted hosted commands. In addition, the method comprises decrypting, by a hosted communication security module on the hosted payload, the encrypted hosted commands by utilizing the hosted COMSEC variety to produce unencrypted hosted commands. Also, the method comprises reconfiguring, by a hosted processor on the hosted payload, the hosted payload according to the unencrypted hosted commands. In addition, the method comprises transmitting, by the hosted payload antenna, hosted user data to a hosted user antenna. Additionally, the method comprises encrypting, by the hosted communication security module, unencrypted hosted payload telemetry by utilizing the hosted COMSEC variety to produce encrypted hosted payload telemetry. Also, the method comprises transmitting, by the hosted payload antenna, the encrypted hosted telemetry. Further, the method comprises decrypting, by the HOC, the encrypted hosted telemetry by utilizing the hosted COMSEC variety to produce the unencrypted hosted telemetry.

In one or more embodiments, the hosted processor comprises the hosted communication security module as a single unit. In some embodiments, the hosted communication security module and the hosted processor are two separate units.

In at least one embodiment, the hosted processor comprises at least one processor. In some embodiments, the host payload comprises at least one processor.

In one or more embodiments, the host communication security module comprises more than one communication security module. In some embodiments, at least one of the communication security modules is a redundant communication security module.

In at least one embodiment, the hosted communication security module comprises more than one communication security module. In some embodiments, at least one of the communication security modules is a redundant communication security module.

In one or more embodiments, the host payload antenna and the hosted payload antenna each comprise at least one radio frequency (RF) antenna. In at least one embodiment, the RF antenna is a reflector antenna. In some embodiments, the RF antenna is a multi-feed array antenna.

In at least one embodiment, the reconfiguring of the host payload and/or the hosted payload comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

In one or more embodiments, the reconfiguring of the host payload comprises reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

In at least one embodiment, the reconfiguring of the hosted payload comprises reconfiguring at least one of: the hosted payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

In one or more embodiments, the vehicle is an airborne vehicle. In at least one embodiment, the airborne vehicle is a satellite, an aircraft, an unmanned aerial vehicle (UAV), or a space plane.

In at least one embodiment, a method for payload operations comprises transmitting, by a host satellite operations center (SOC), encrypted host commands, wherein the encrypted host commands are encrypted utilizing a host communication security (COMSEC) variety. The method further comprises receiving, by a command receiver on a vehicle, the encrypted host commands. Also, the method comprises decrypting, by a host communication security module, the encrypted host commands by utilizing the host COMSEC variety to produce unencrypted host commands. In addition, the method comprises commanding a hosted payload on or off according to the unencrypted host commands. Additionally, the method comprises reconfiguring a host payload according to the unencrypted host commands. Also, the method comprises transmitting, by a host payload antenna, host user data to a host user antenna. In addition, the method comprises receiving, by the host user antenna, the host user data. Additionally, the method comprises encrypting, by the host communication security module, unencrypted host payload telemetry by utilizing the host COMSEC variety to produce encrypted host payload telemetry. Also, the method comprises transmitting, by the host payload antenna, the encrypted host payload telemetry. In addition, the method comprises decrypting, by the host SOC, the host payload telemetry by utilizing the host COMSEC variety to produce the unencrypted host payload telemetry.

Also, the method comprises transmitting, by a hosted payload (HoP) operation center (HOC), encrypted hosted commands, wherein the encrypted hosted commands are encrypted utilizing a hosted COMSEC variety. In addition, the method comprises receiving, by the hosted payload antenna on the vehicle, the encrypted hosted commands. Additionally, the method comprises decrypting, by the hosted communication security module on the hosted payload, the encrypted hosted commands by utilizing the hosted COMSEC variety to produce unencrypted hosted commands. Also, the method comprises reconfiguring, by a hosted processor on the hosted payload, the hosted payload according to the unencrypted hosted commands. In addition, the method comprises transmitting, by the hosted payload antenna, hosted user data to a hosted user antenna. Also the method comprises encrypting, by the hosted communication security module, unencrypted hosted payload telemetry utilizing the hosted COMSEC variety to produce encrypted hosted payload telemetry. Additionally, the method comprises transmitting, by the hosted payload antenna, the encrypted hosted telemetry. Further, the method comprises decrypting, by the HOC, the encrypted hosted telemetry by utilizing the hosted COMSEC variety to produce the unencrypted hosted telemetry.

In one or more embodiments, a method for payload operations comprises transmitting, by a host satellite operations center (SOC), encrypted host commands, wherein the encrypted host commands are encrypted utilizing a host communication security (COMSEC) variety. The method further comprises receiving, by a host payload antenna on a vehicle, the encrypted host commands. Also, the method comprises decrypting, by a host communication security module, the encrypted host commands by utilizing the host COMSEC variety to produce unencrypted host commands. In addition, the method comprises commanding a hosted payload on or off according to the unencrypted host commands. Additionally, the method comprises reconfiguring a host payload according to the unencrypted host commands. Also, the method comprises transmitting, by a host payload antenna, host user data to a host user antenna. In addition, the method comprises encrypting, by the host communication security module, unencrypted host payload telemetry by utilizing the host COMSEC variety to produce encrypted host payload telemetry. Also, the method comprises transmitting, by a telemetry transmitter, the encrypted host payload telemetry. In addition, the method comprises decrypting, by the host SOC, the host payload telemetry by utilizing the host COMSEC variety to produce the unencrypted host payload telemetry.

Also, the method comprises transmitting, by a hosted payload (HoP) operation center (HOC), encrypted hosted commands, wherein the encrypted hosted commands are encrypted utilizing a hosted COMSEC variety. In addition, the method comprises receiving, by the hosted payload antenna on the vehicle, the encrypted hosted commands. Additionally, the method comprises decrypting, by a hosted communication security module on the hosted payload, the encrypted hosted commands by utilizing the hosted COMSEC variety to produce unencrypted hosted commands. Also, the method comprises reconfiguring, by the hosted processor on the hosted payload, the hosted payload according to the unencrypted hosted commands. In addition, the method comprises transmitting, by the hosted payload antenna, hosted user data to a hosted user antenna. Additionally, the method comprises encrypting, by the hosted communication security module, unencrypted hosted payload telemetry to produce encrypted hosted payload telemetry. Also, the method comprises transmitting, by the hosted payload antenna, the encrypted hosted telemetry. Further, the method comprises decrypting, by the HOC, the encrypted hosted telemetry by utilizing the hosted COMSEC variety to produce the unencrypted hosted telemetry.

In at least one embodiment, a method for payload operations comprises transmitting, by a host satellite operations center (SOC), encrypted host commands, wherein the encrypted host commands are encrypted utilizing a host communication security (COMSEC) variety. Also, the method comprises receiving, by a host payload antenna on a vehicle, the encrypted host commands. In addition, the method comprises decrypting, by a host communication security module, the encrypted host commands by utilizing the host COMSEC variety to produce unencrypted host commands. In addition, the method comprises commanding a hosted payload on or off according to the unencrypted host commands. Also, the method comprises reconfiguring a host payload according to the unencrypted host commands. Additionally, the method comprises transmitting, by a host payload antenna, host user data to a host user antenna. Also, the method comprises encrypting, by the host communication security module, unencrypted host payload telemetry utilizing the host COMSEC variety to produce encrypted host payload telemetry. In addition, the method comprises transmitting, by the host payload antenna, the encrypted host payload telemetry. Further, the method comprises decrypting, by the host SOC, the host payload telemetry by utilizing the host COMSEC variety to produce the unencrypted host payload telemetry.

Also, the method comprises transmitting, by a hosted payload (HoP) operation center (HOC), encrypted hosted commands, wherein the encrypted hosted commands are encrypted utilizing a hosted COMSEC variety. In addition, the method comprises receiving, by a hosted payload antenna on the vehicle, the encrypted hosted commands. Also, the method comprises decrypting, by a hosted communication security module on the hosted payload, the encrypted hosted commands by utilizing the hosted COMSEC variety to produce unencrypted hosted commands. Additionally, the method comprises reconfiguring, by a hosted processor on the hosted payload, the hosted payload according to the unencrypted hosted commands. Also, the method comprises transmitting, by the hosted payload antenna, hosted user data to a hosted user antenna. In addition, the method comprises encrypting, by the hosted communication security module, unencrypted hosted payload telemetry to produce encrypted hosted payload telemetry. Additionally, the method comprises transmitting, by the hosted payload antenna, the encrypted hosted telemetry. Further, the method comprises decrypting, by the HOC, the encrypted hosted telemetry by utilizing the hosted COMSEC variety to produce the unencrypted hosted telemetry.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIG. 1 is a diagram showing the disclosed system for secured independent hosted payload operations, where the host commanding and host telemetry are both transmitted out-of-band, in accordance with at least one embodiment of the present disclosure.

FIGS. 2A, 2B, 2C, 2D, 2E, and 2F together show a flow chart for the disclosed method for secured independent hosted payload operations, where the host commanding and host telemetry are both transmitted out-of-band, in accordance with at least one embodiment of the present disclosure.

Figure 3:
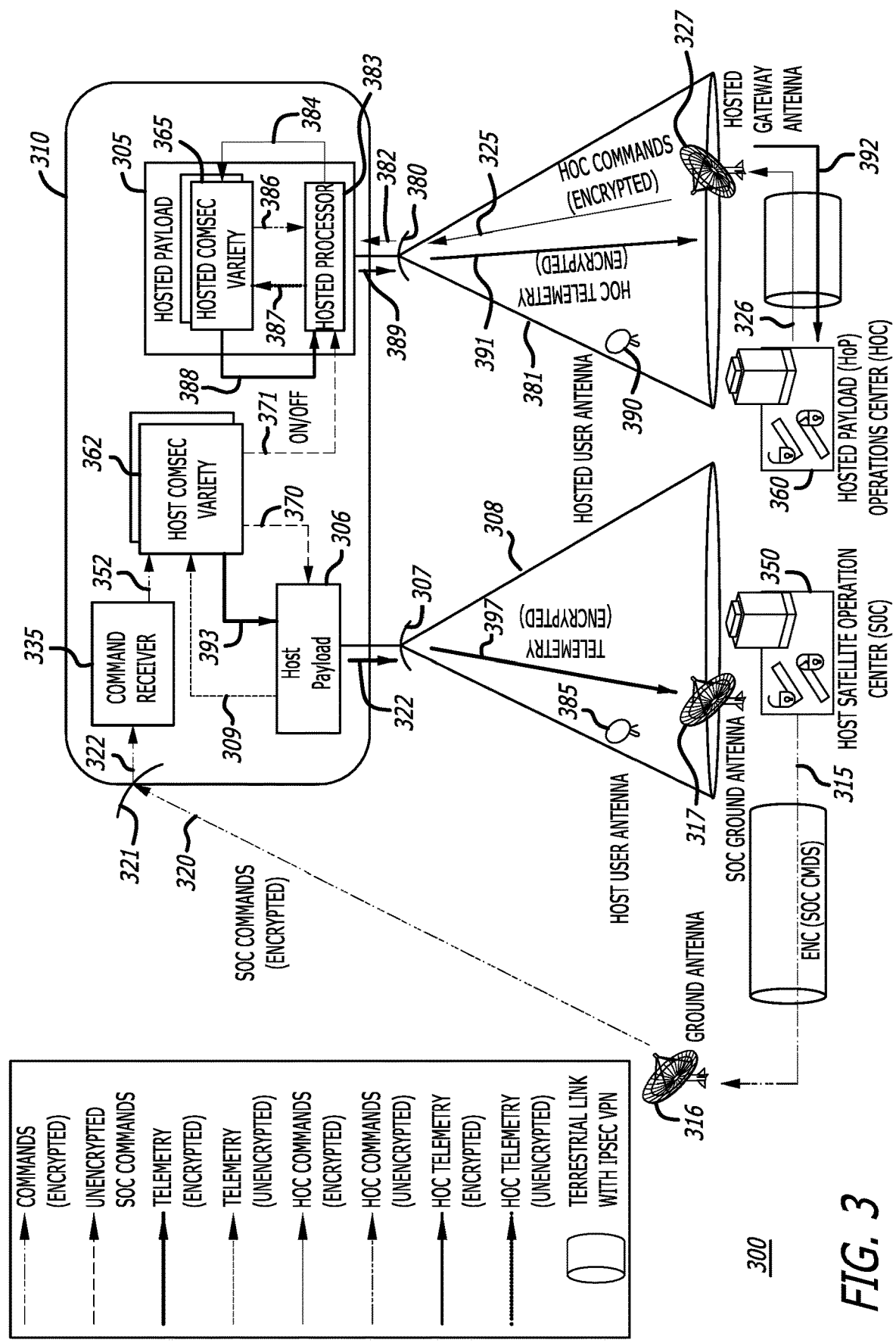
Figure 4A:
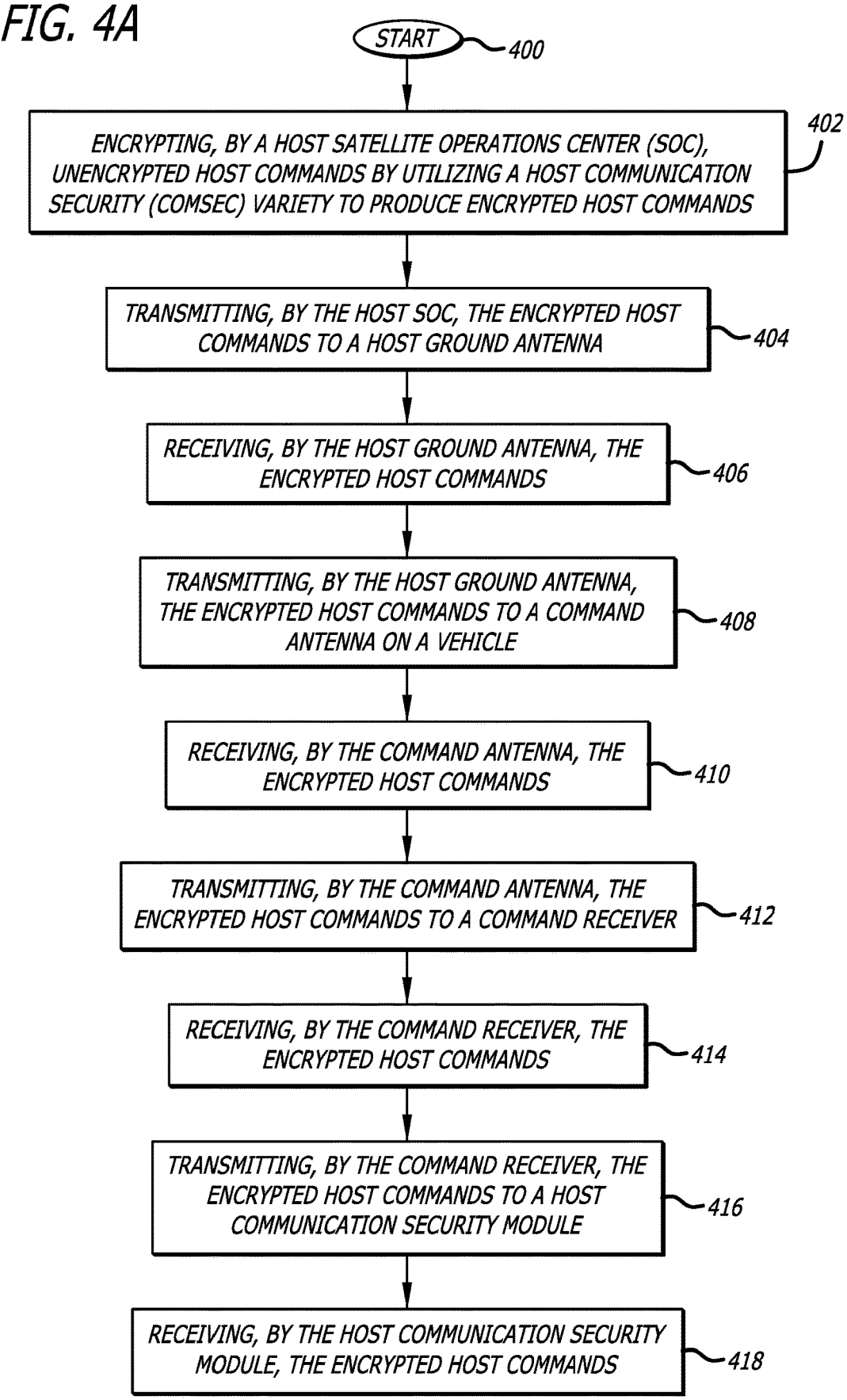
Figure 4B:
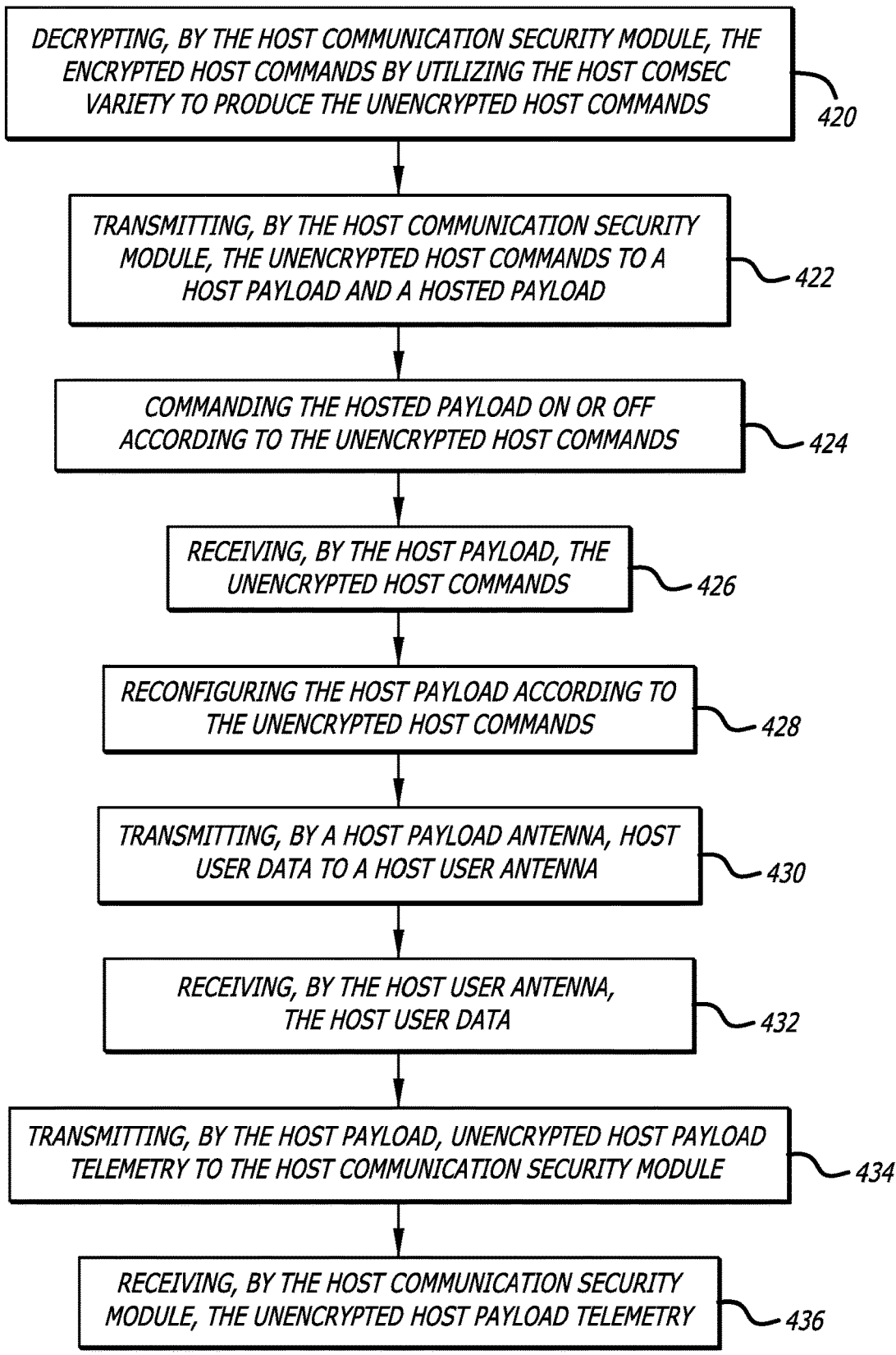
Figure 4C:
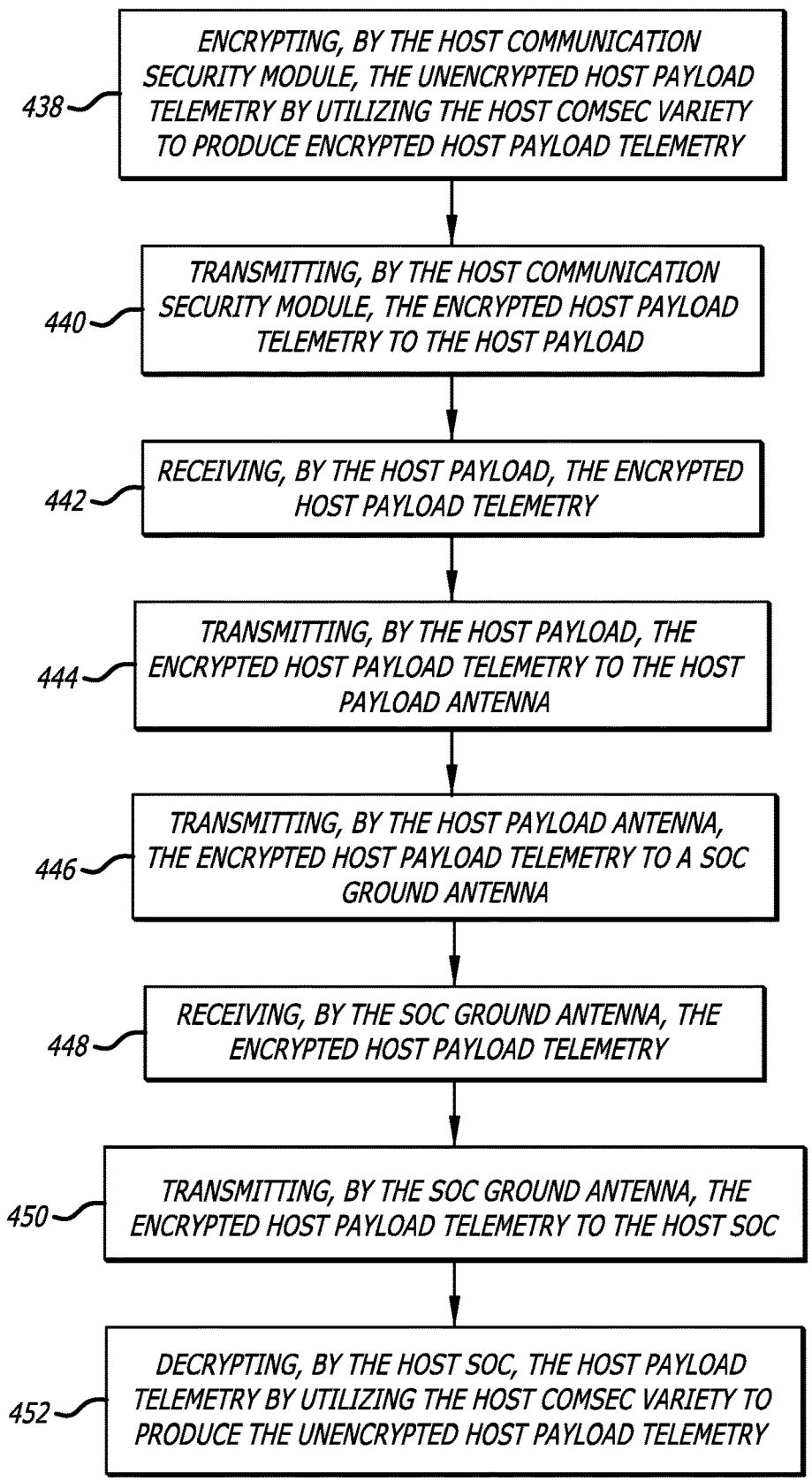
Figure 4D:
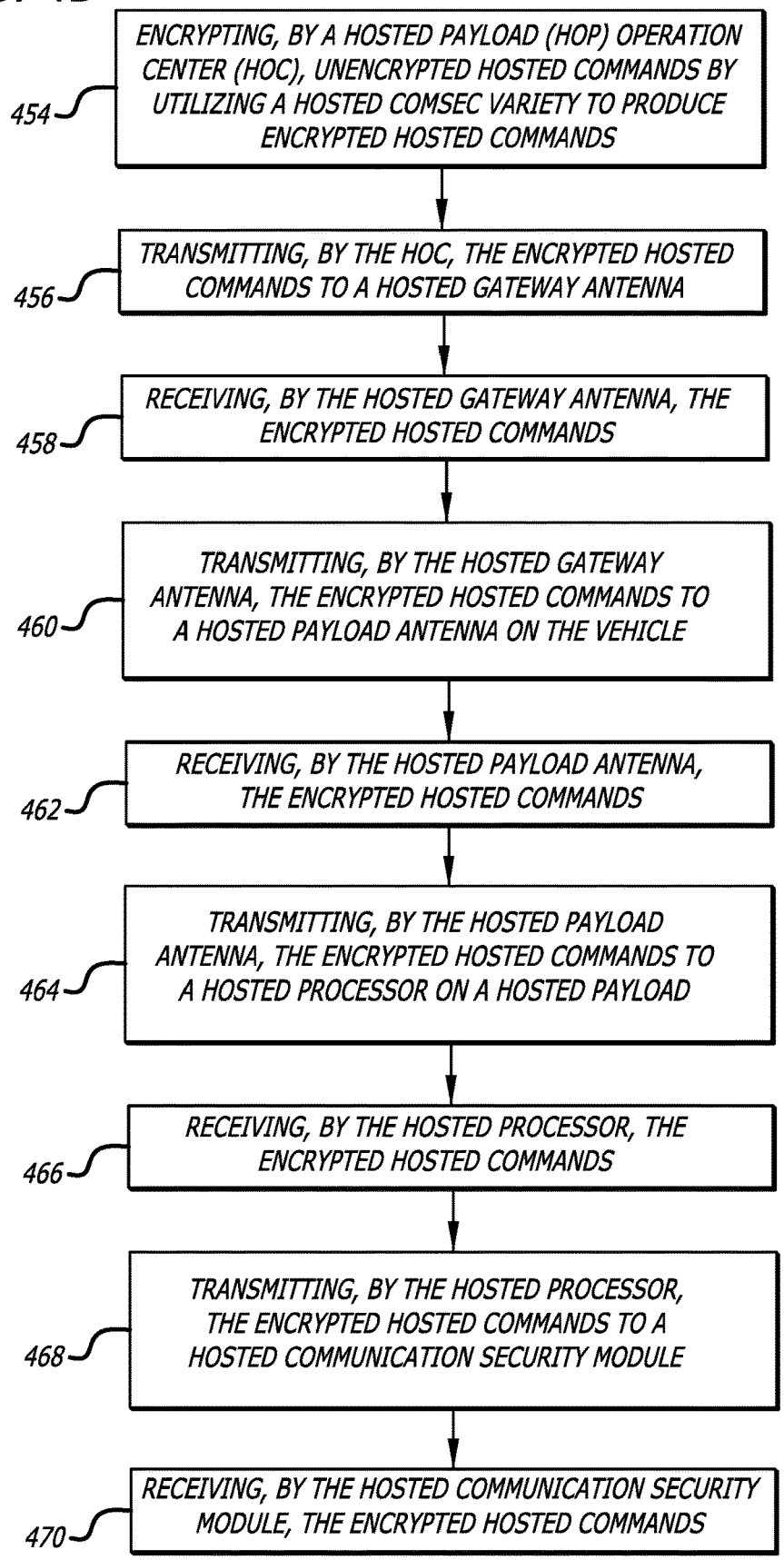
Figure 4E:
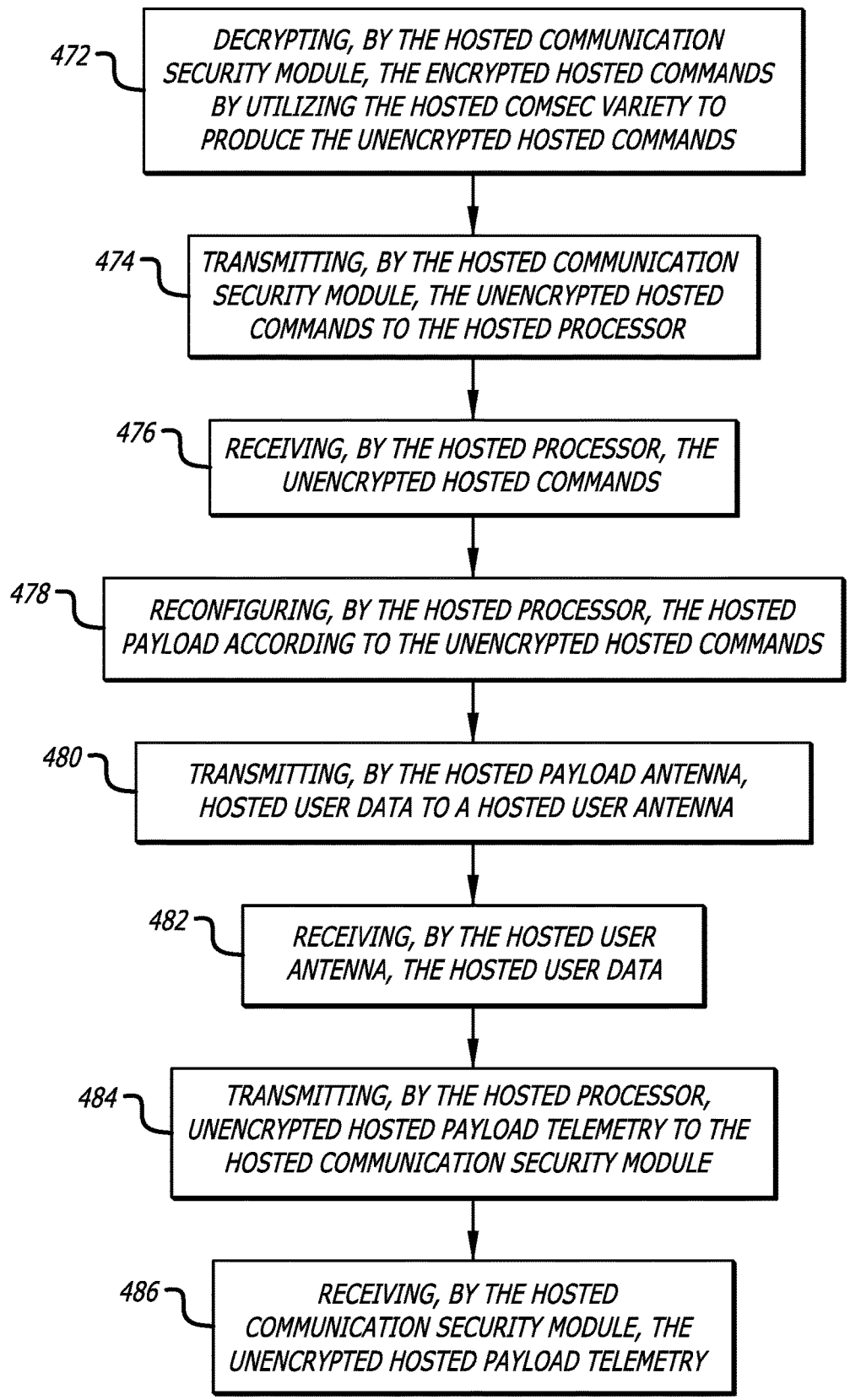
Figure 4F:
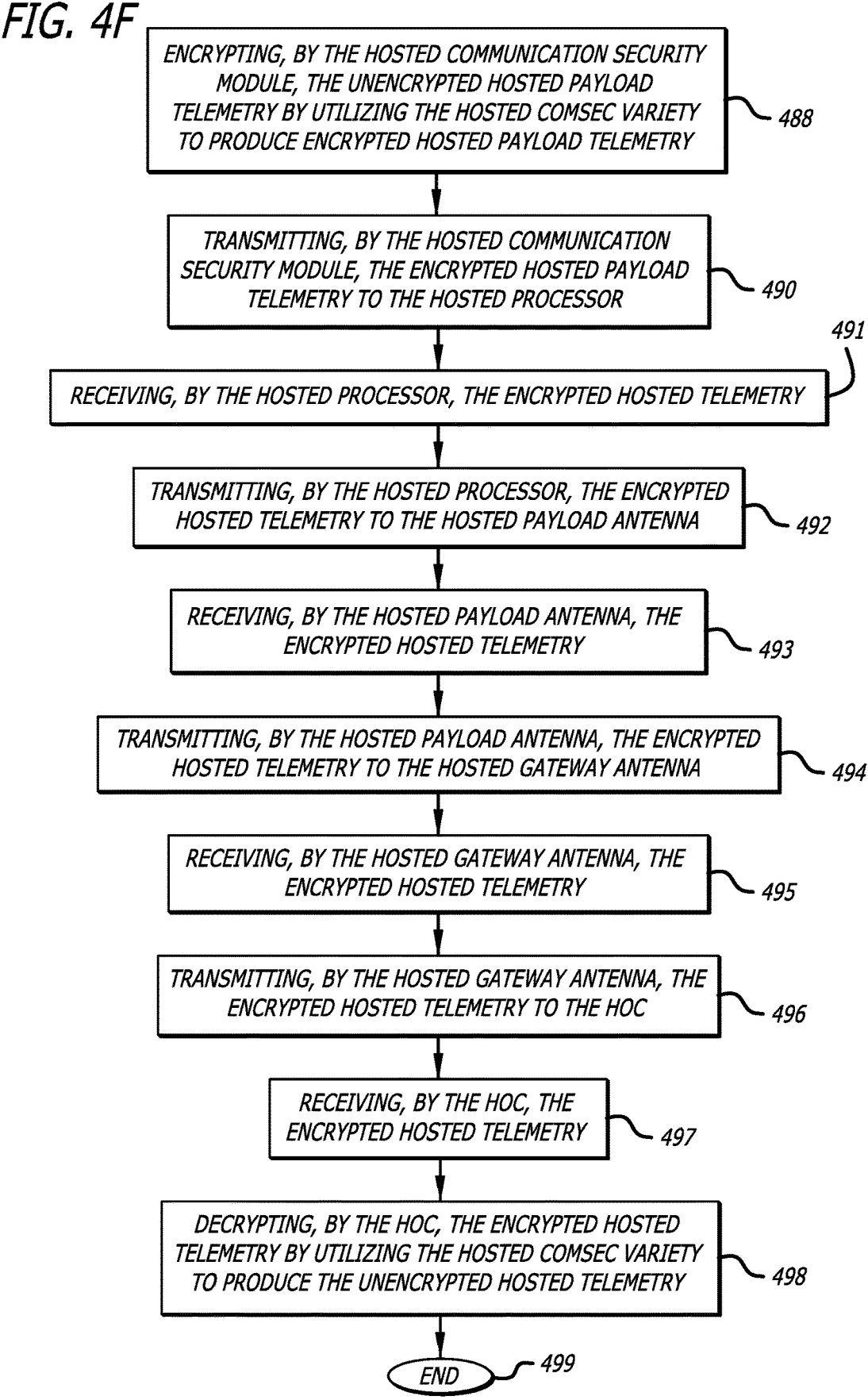

FIG. 3 is a diagram showing the disclosed system for secured independent hosted payload operations, where the host commanding is transmitted out-of-band and the host telemetry is transmitted inband, in accordance with at least one embodiment of the present disclosure.

FIGS. 4A, 4B, 4C, 4D, 4E, and 4F together show a flow chart for the disclosed method for secured independent hosted payload operations, where the host commanding is transmitted out-of-band and the host telemetry is transmitted inband, in accordance with at least one embodiment of the present disclosure.

Figure 5:
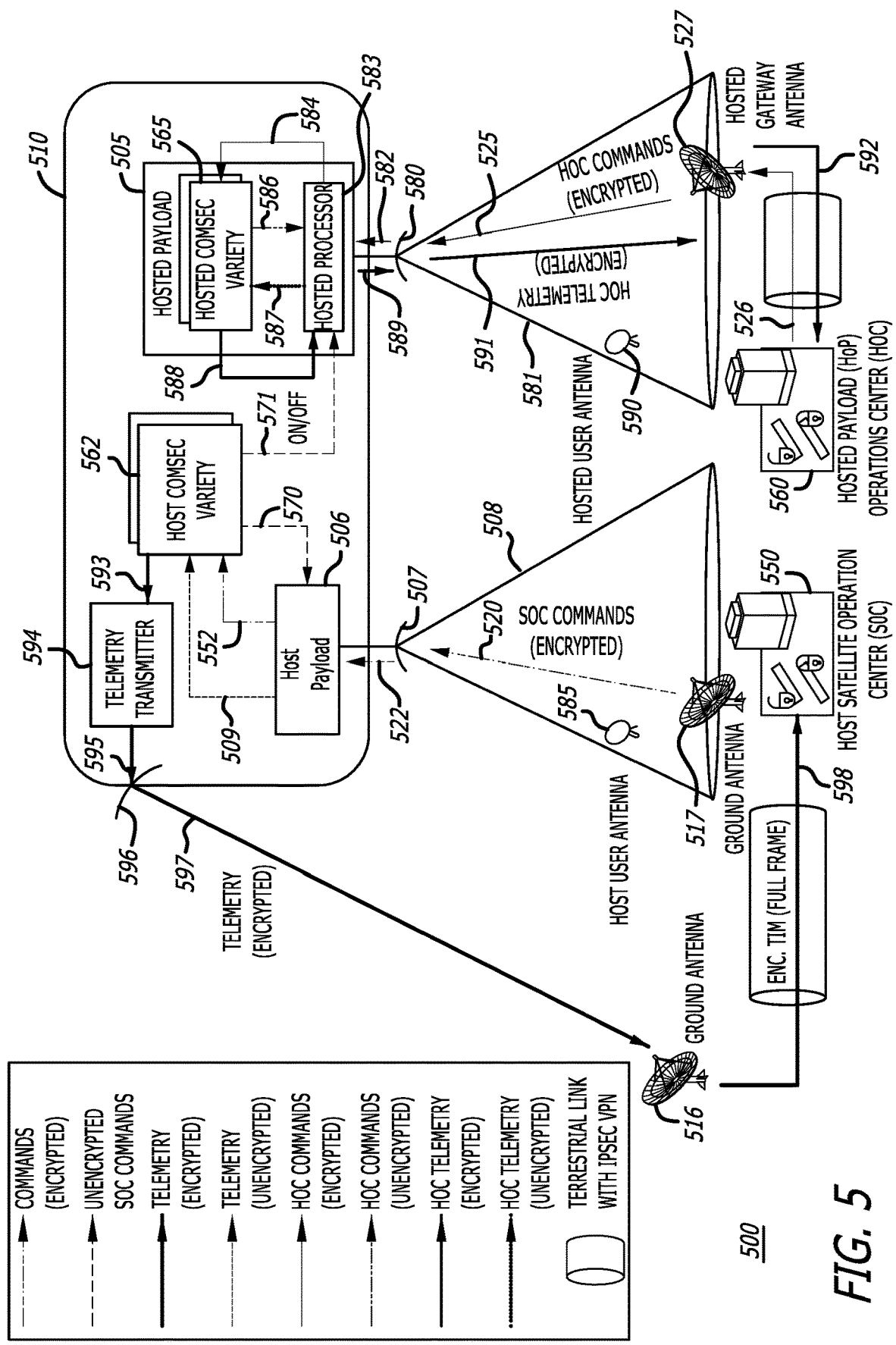
Figure 6A:
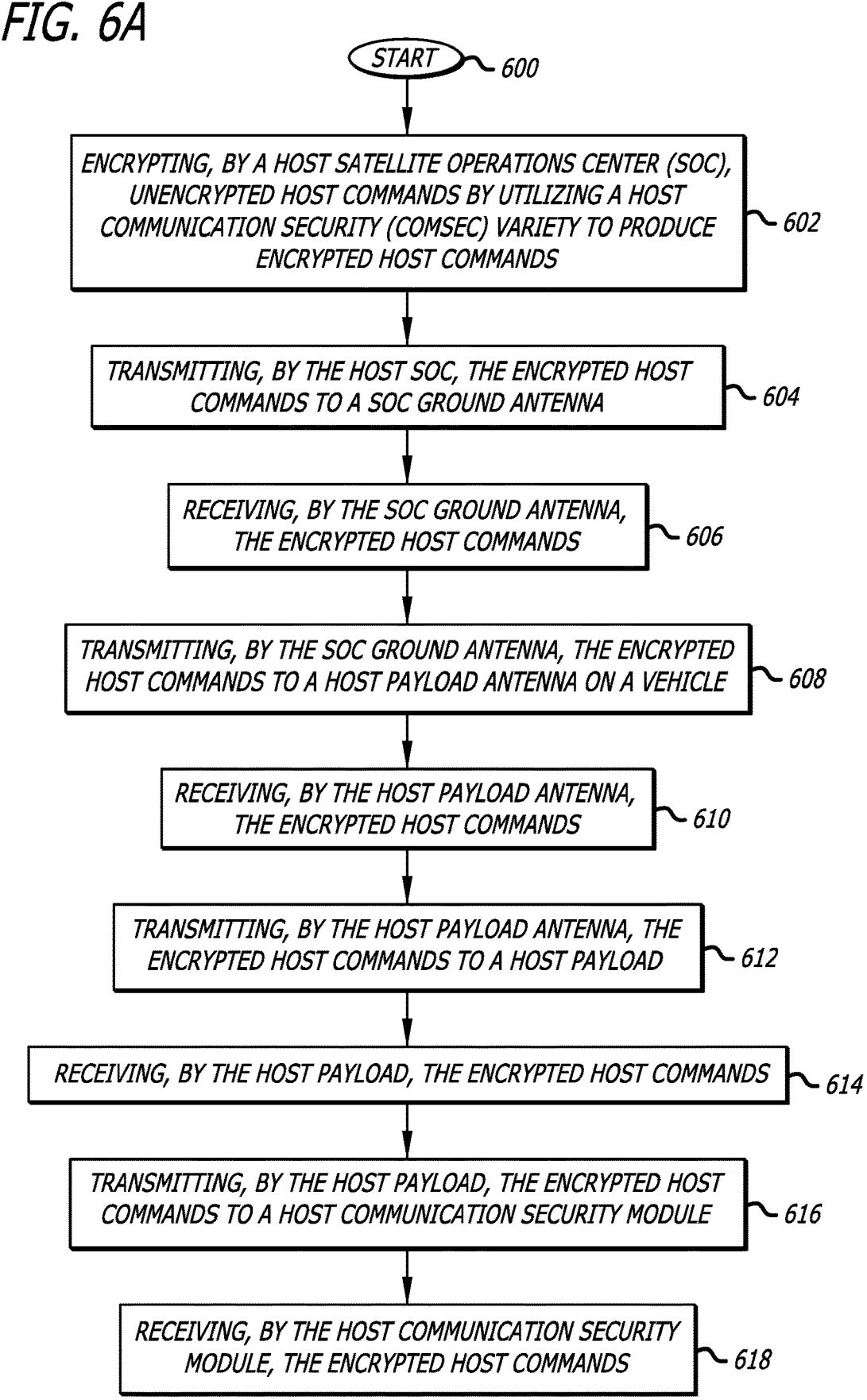
Figure 6B:
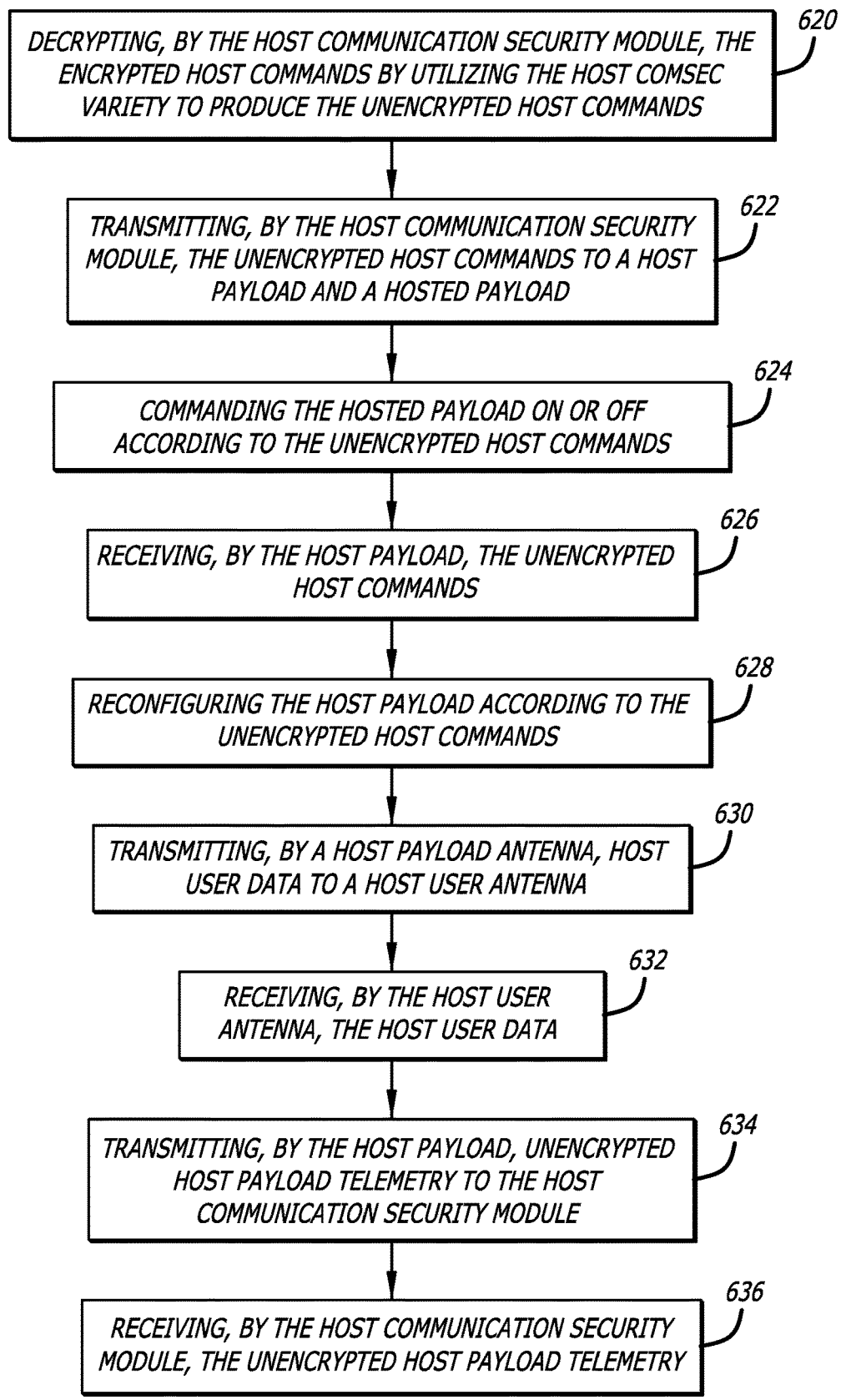
Figure 6C:
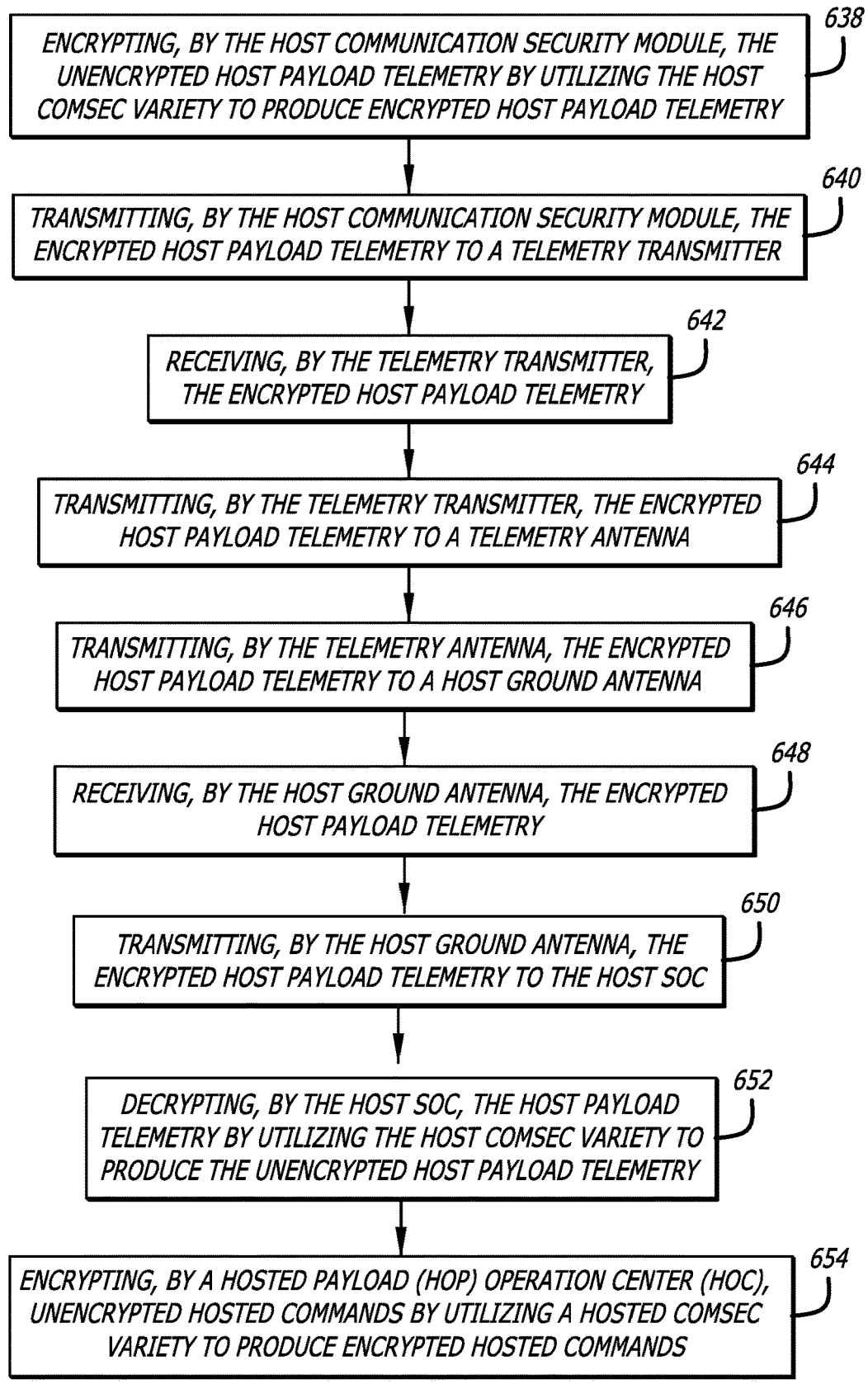
Figure 6D:
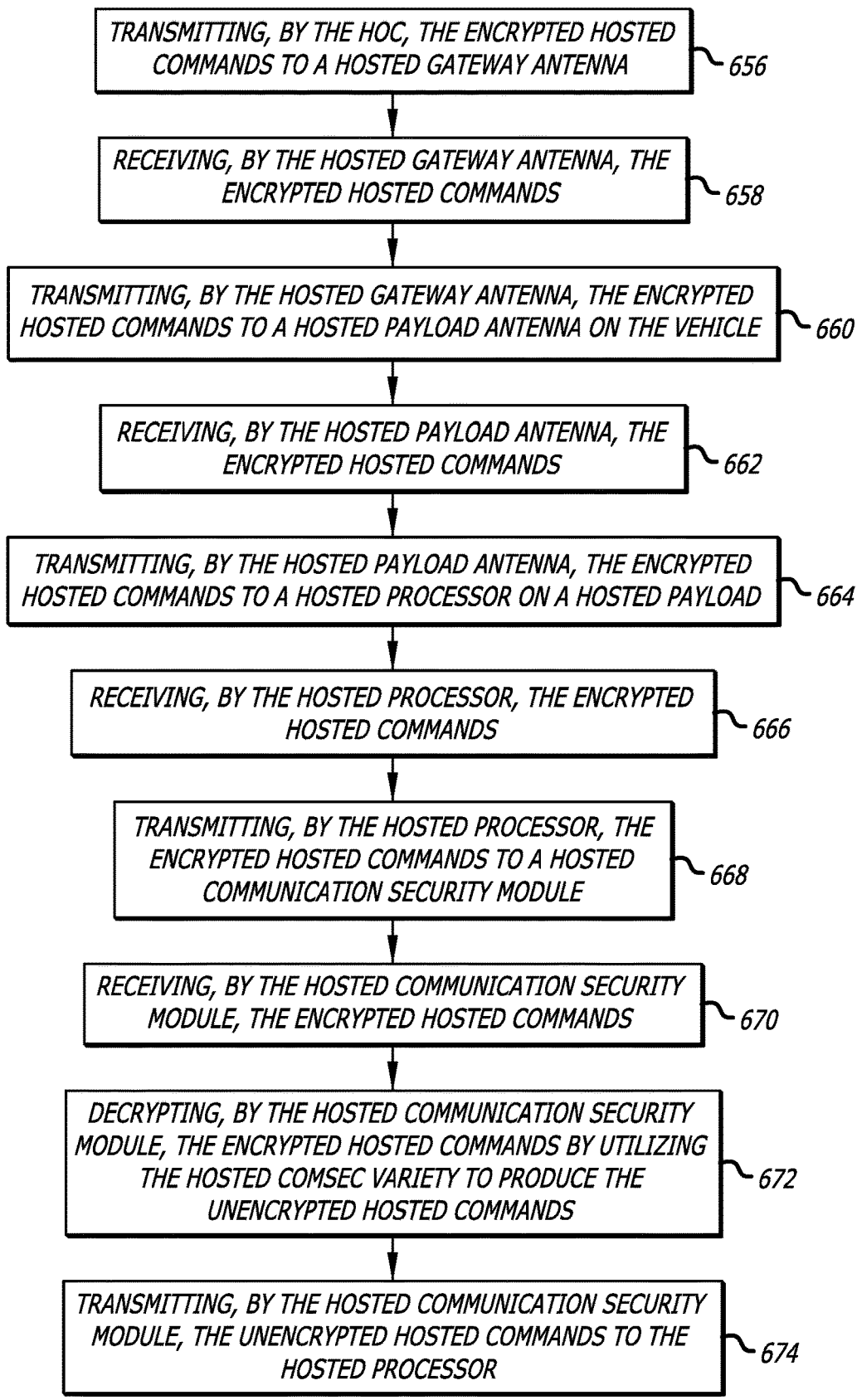
Figure 6E:
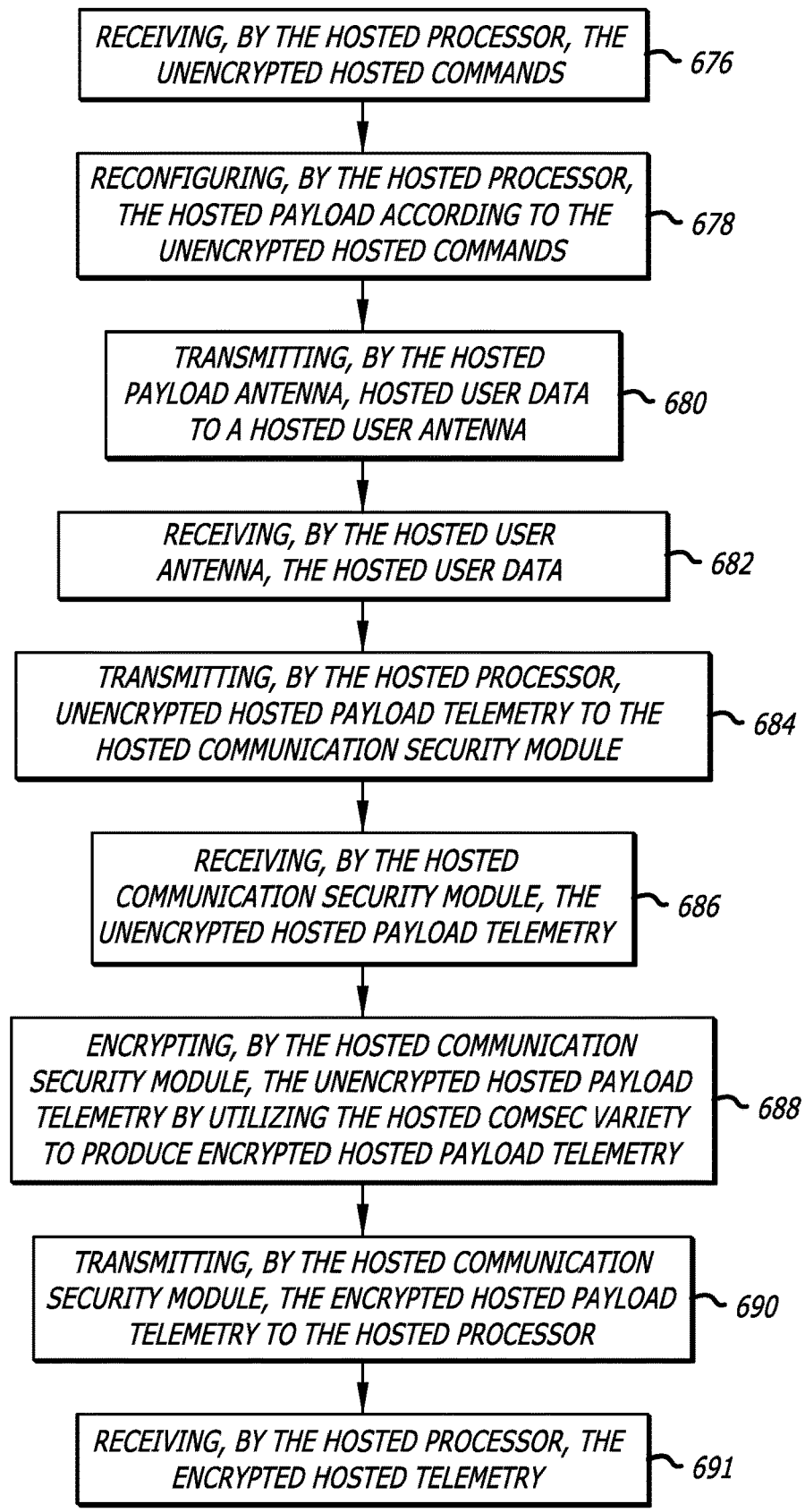
Figure 6F:
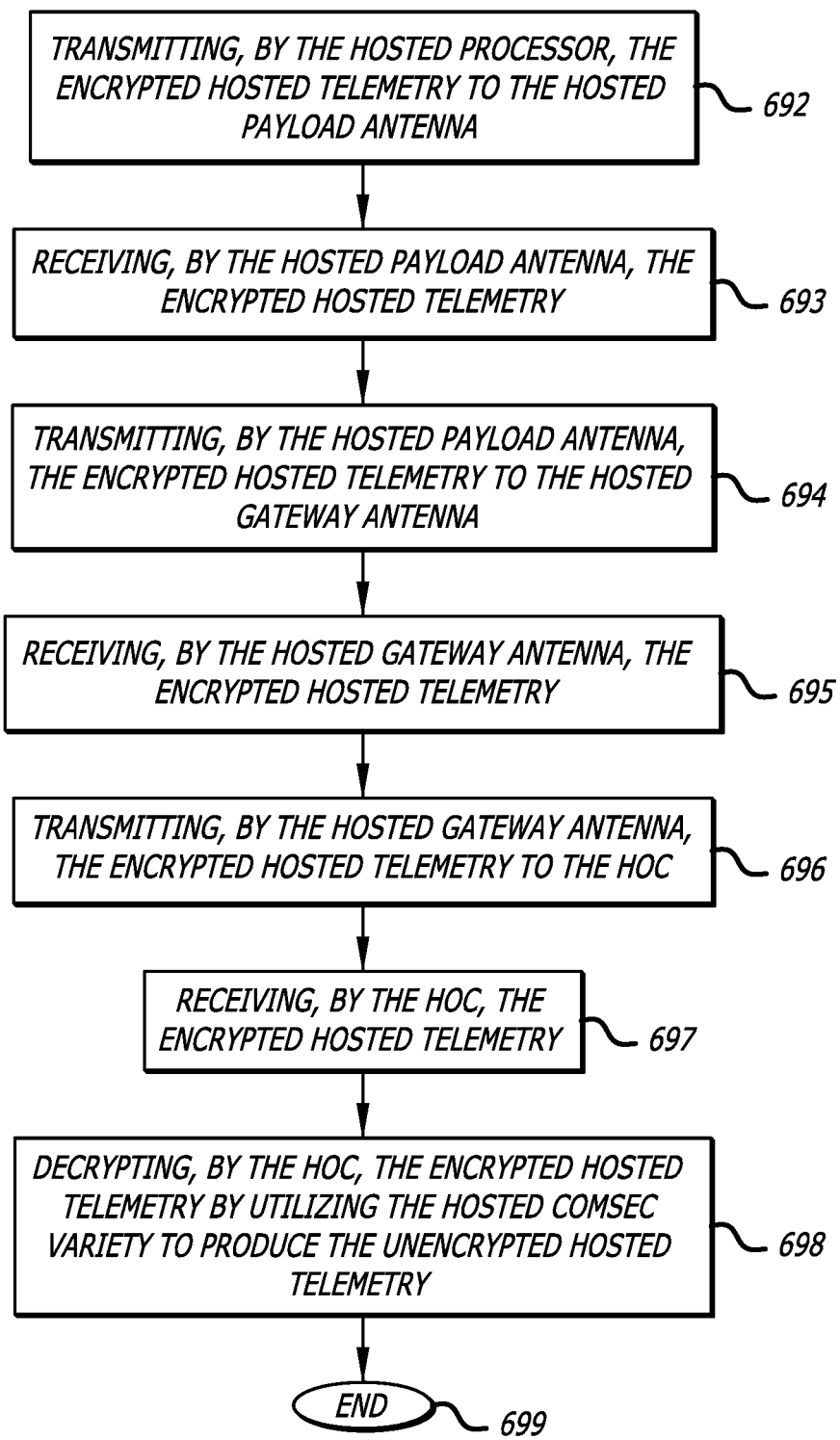

FIG. 5 is a diagram showing the disclosed system for secured independent hosted payload operations, where the host commanding is transmitted inband and the host telemetry is transmitted out-of-band, in accordance with at least one embodiment of the present disclosure.

FIGS. 6A, 6B, 6C, 6D, 6E, and 6F together show a flow chart for the disclosed method for secured independent hosted payload operations, where the host commanding is transmitted inband and the host telemetry is transmitted out-of-band, in accordance with at least one embodiment of the present disclosure.

Figure 7:
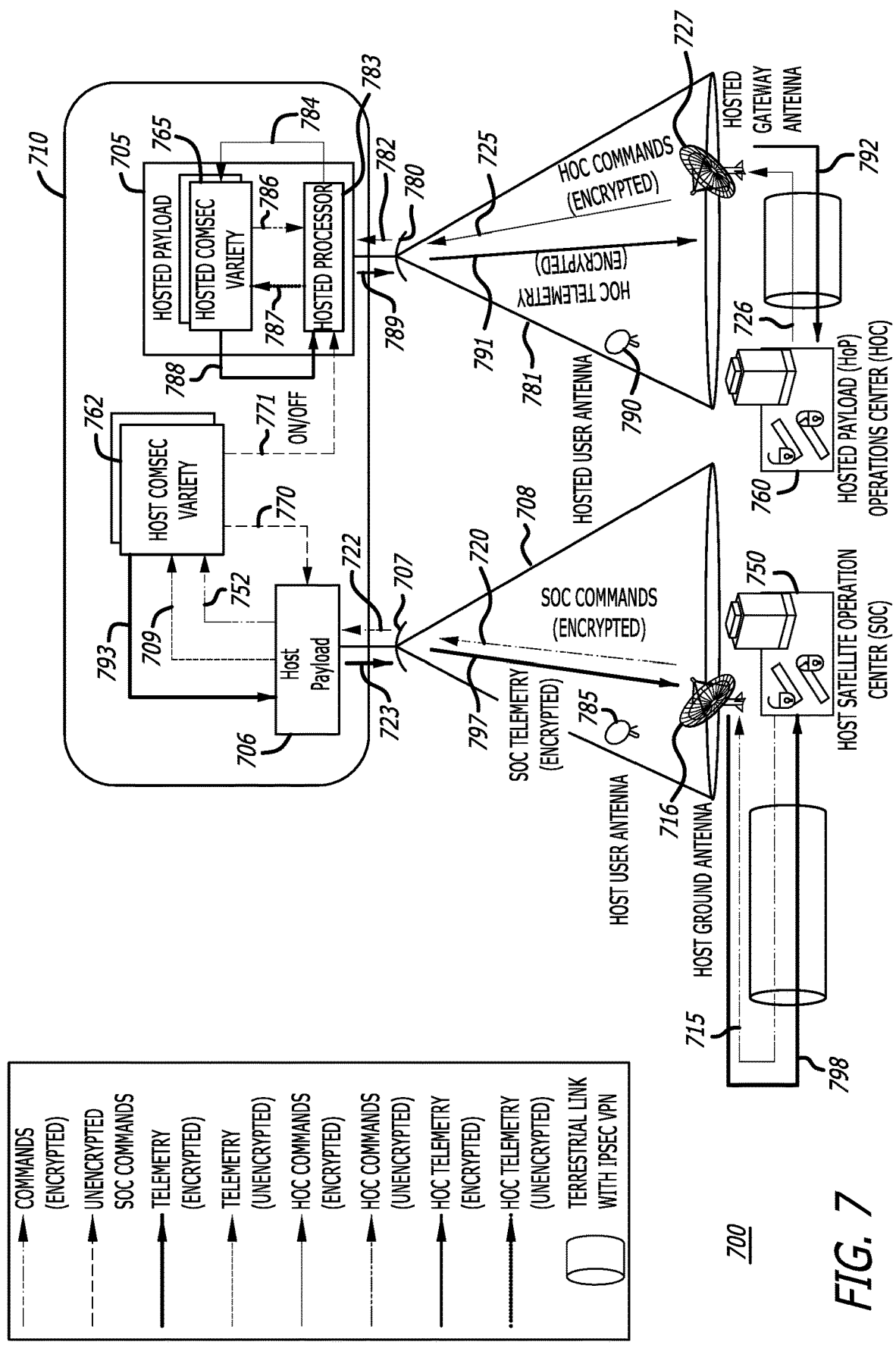
Figure 8A:
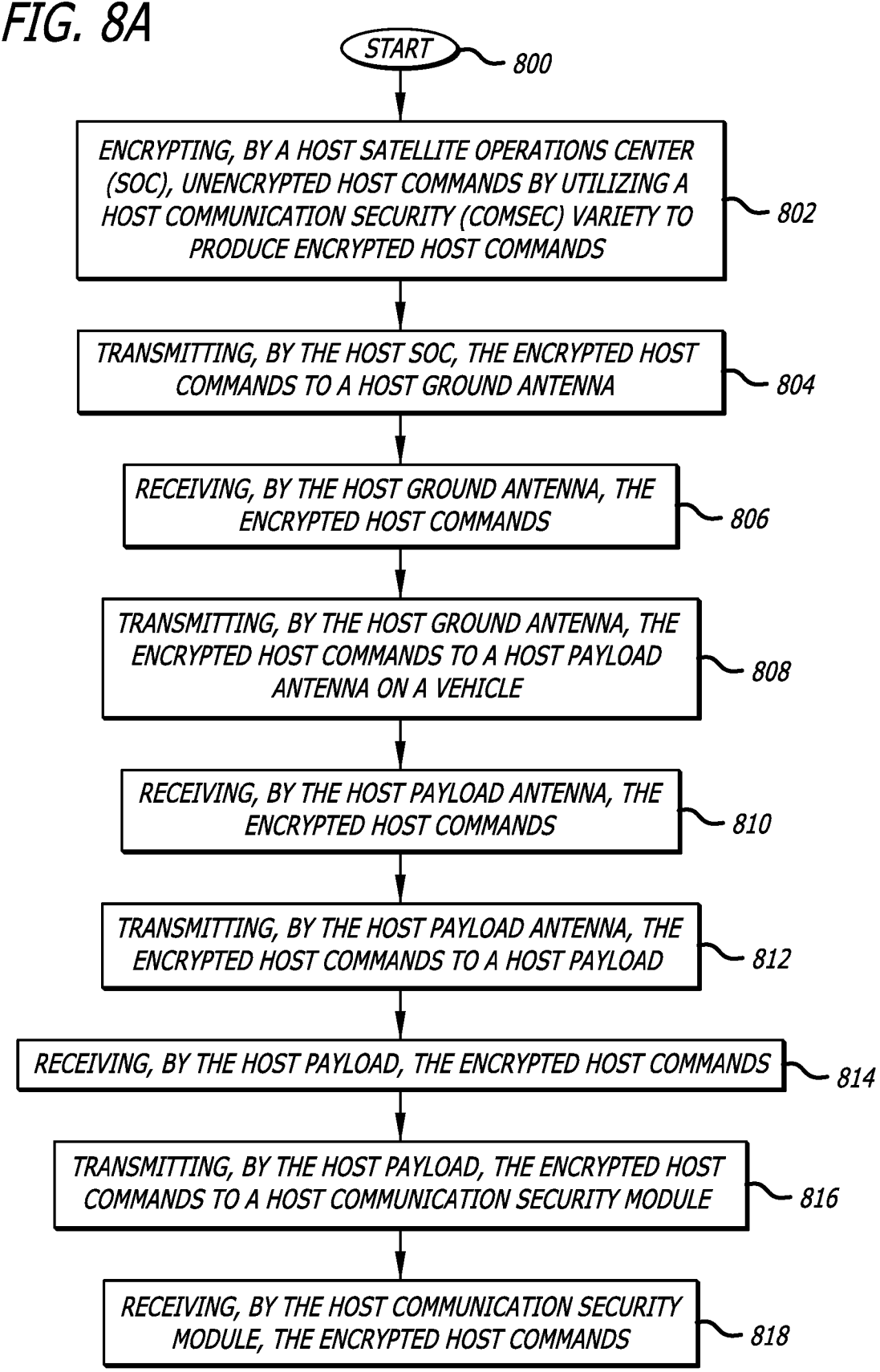
Figure 8B:
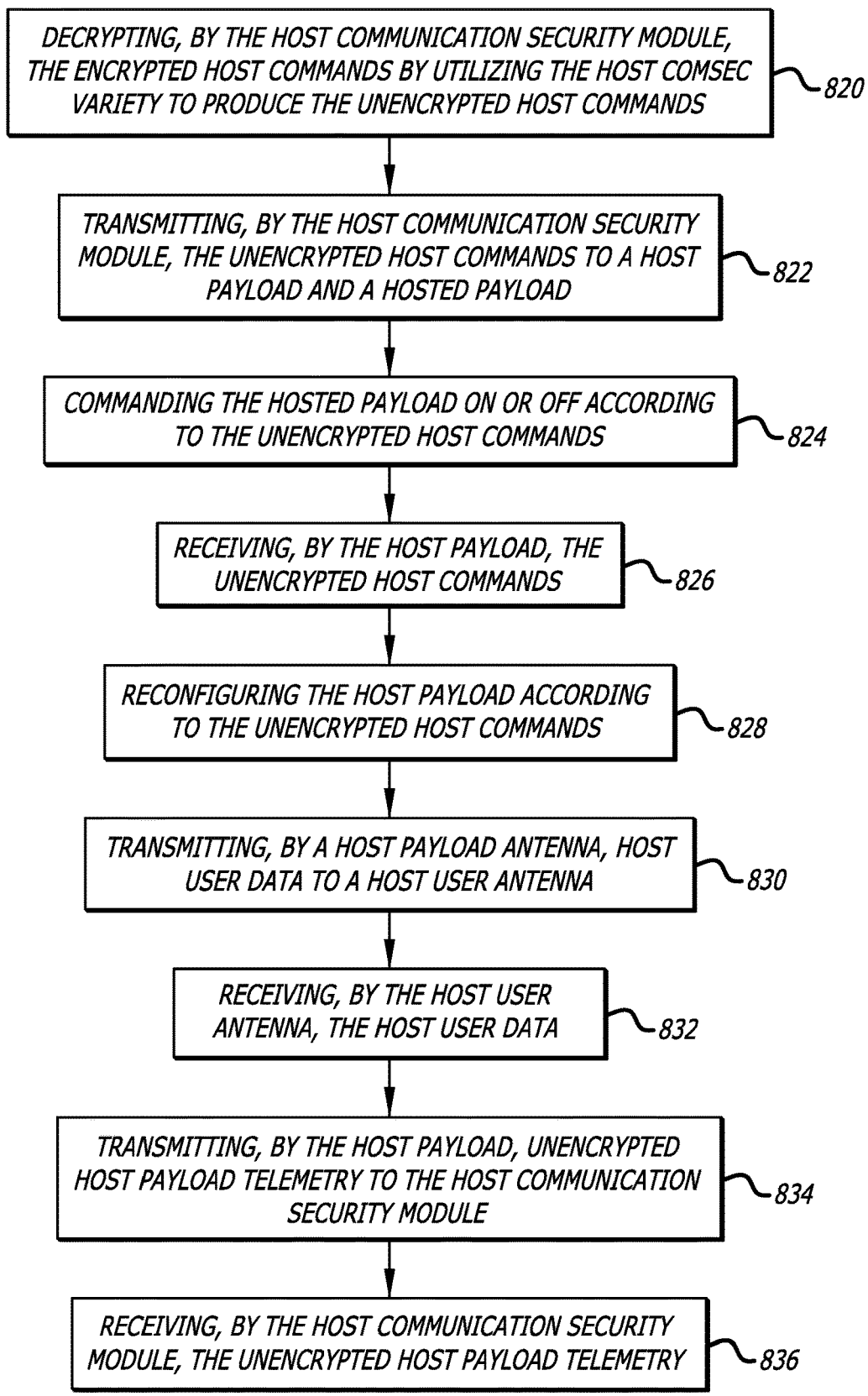
Figure 8C:
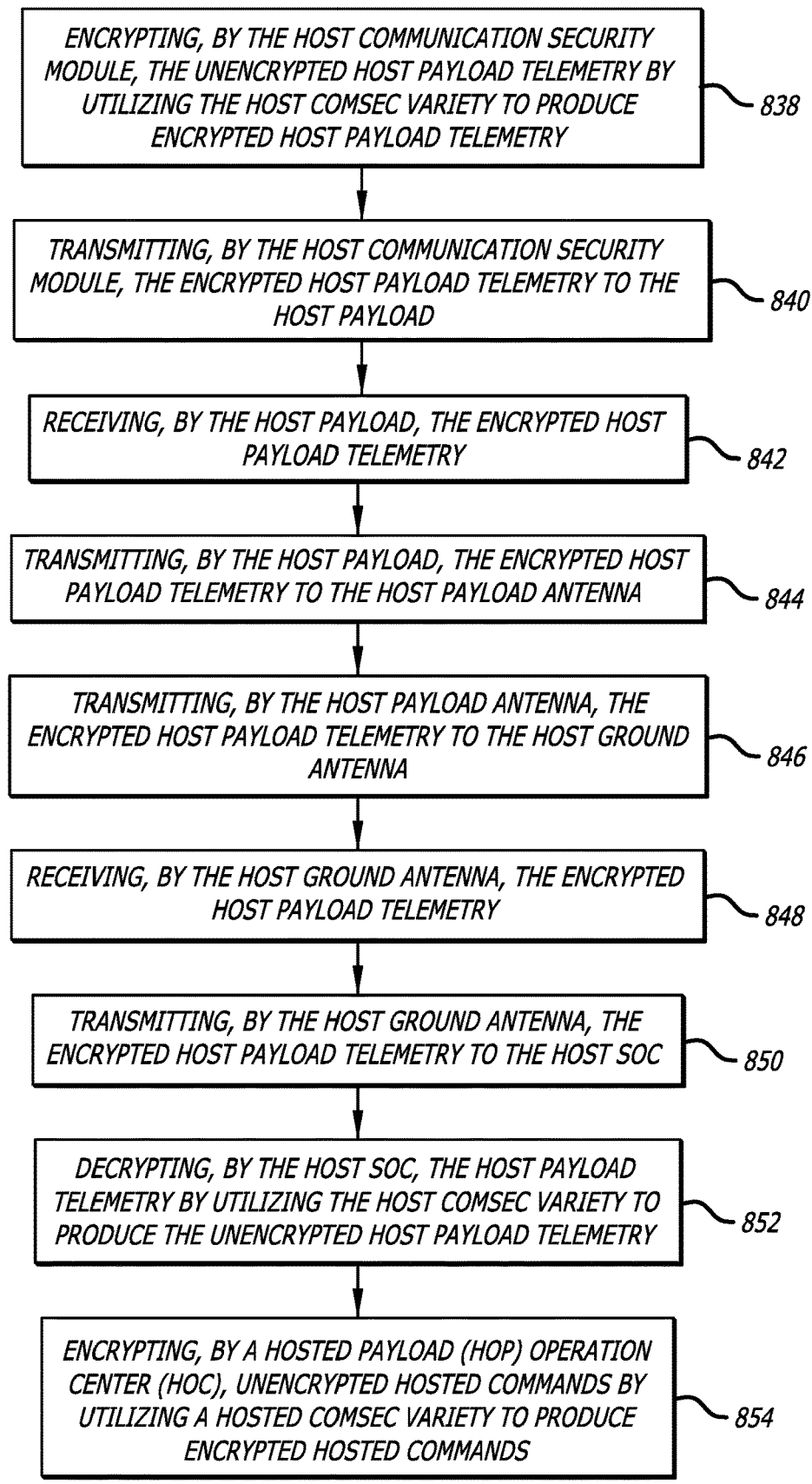
Figure 8D:
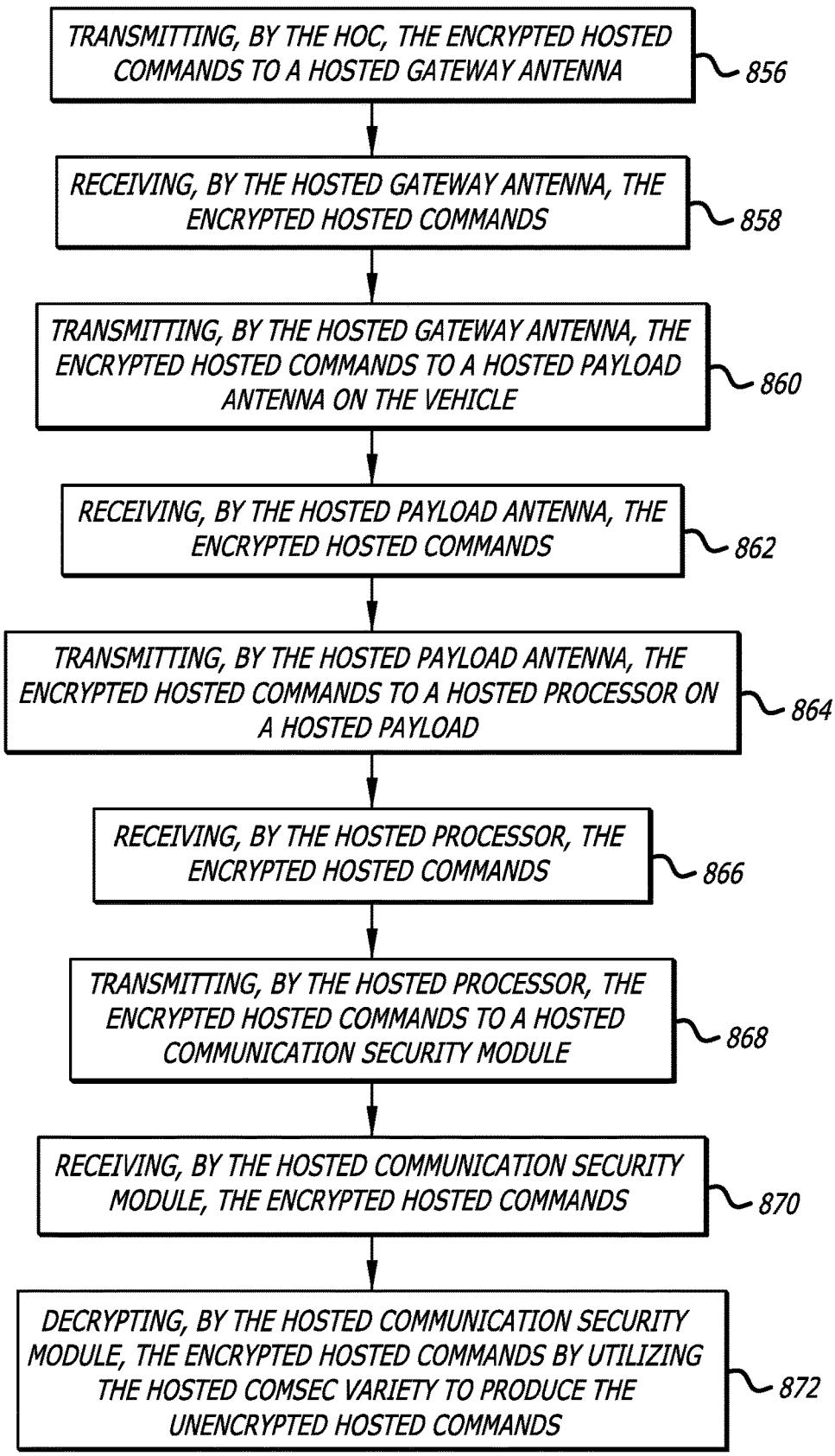
Figure 8E:
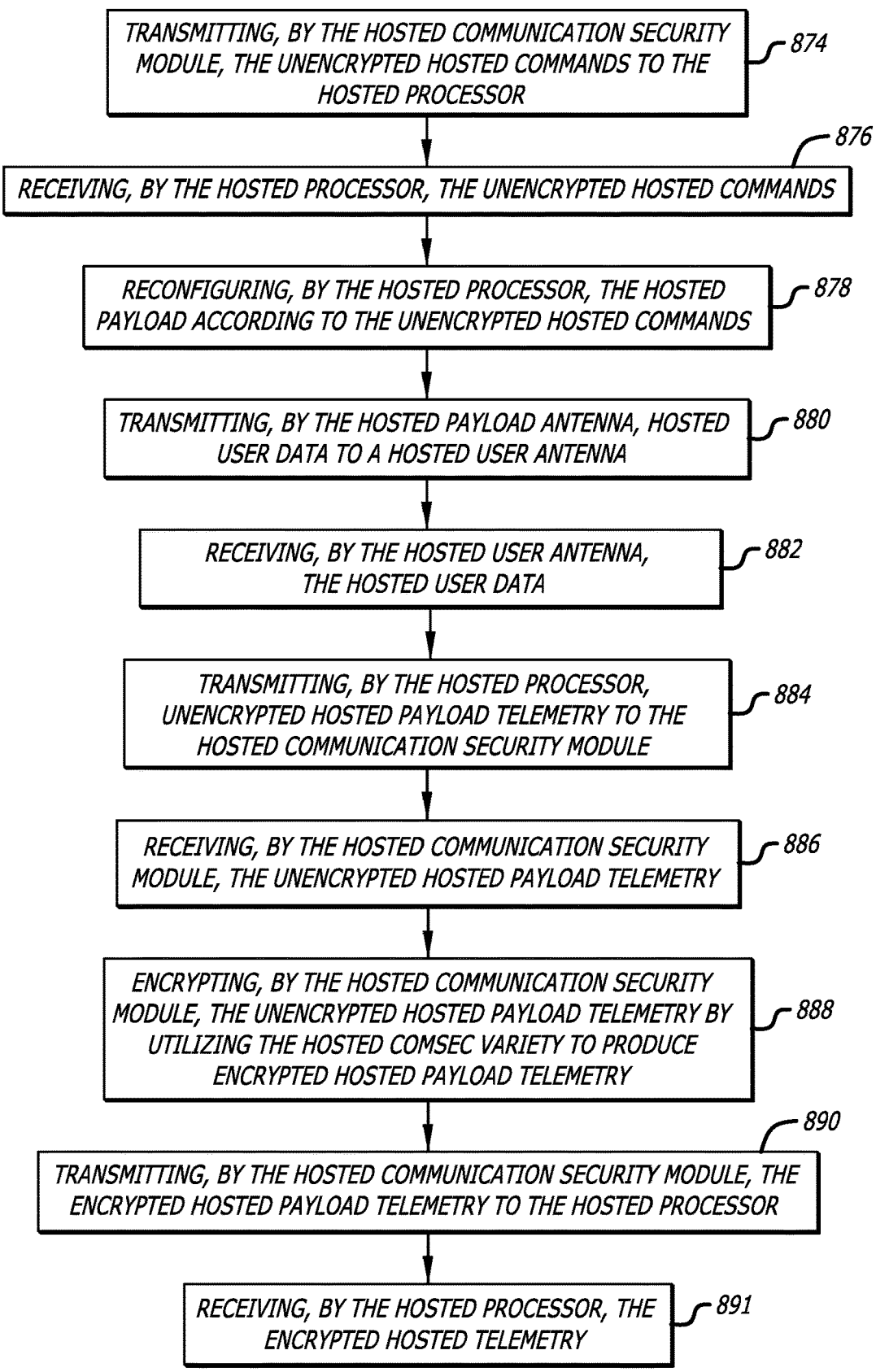
Figure 8F:
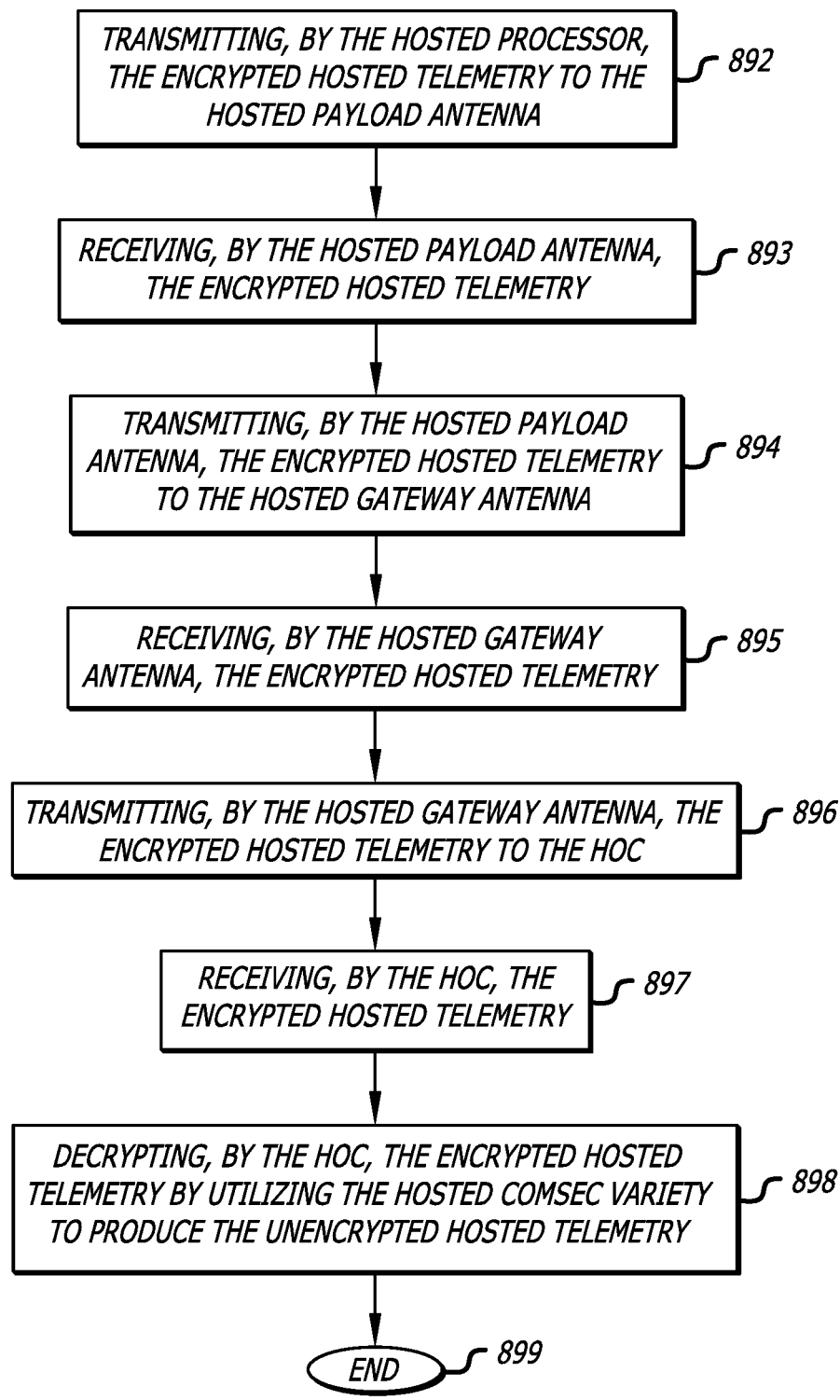

FIG. 7 is a diagram showing the disclosed system for secured independent hosted payload operations, where the host commanding and host telemetry are both transmitted inband, in accordance with at least one embodiment of the present disclosure.

FIGS. 8A, 8B, 8C, 8D, 8E, and 8F together show a flow chart for the disclosed method for secured independent hosted payload operations, where the host commanding and host telemetry are both transmitted inband, in accordance with at least one embodiment of the present disclosure.

DESCRIPTION

The methods and apparatus disclosed herein provide an operative system for secured independent hosted payload operations. The system of the present disclosure allows for vehicle operators to privately share vehicle resources.

As previously mentioned above, currently, typical payload operations for a vehicle (e.g., a satellite) have the ability to perform switching of inputs to outputs of the payload on the vehicle. All of this switching on the payload is commanded and controlled by a single satellite controller with no resource allocation privacy.

The disclosed system allows for private vehicle resource allocation and control that provides vehicle users the ability to privately, dynamically, allocate resources (e.g., a host payload and/or a hosted payload) on demand.

It should be noted that the host payload and/or the hosted payload for the disclosed system for private vehicle resource allocation and control may employ various different types of transponders. For example, various different types of transponders may be employed including, but not limited to, various different types of digital transponders, various different types of analog transponders (e.g., conventional repeater-type transponders), and various different types of combination analog/digital transponders.

It should be noted that in this disclosure, inband frequency band(s) refer to a frequency band(s) that is the same frequency band(s) utilized to transmit payload data (e.g., host payload data and/or hosted payload data); and out-of-band frequency band(s) refer to a frequency band(s) that is not the same frequency band(s) utilized to transmit payload data (e.g., host payload data).

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the system described herein is merely one example embodiment of the present disclosure.

For the sake of brevity, conventional techniques and components related to satellite communication systems, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

FIG. 1 is a diagram 100 showing the disclosed system for secured independent hosted payload operations, where the host commanding and host telemetry are both transmitted out-of-band, in accordance with at least one embodiment of the present disclosure. In this figure, a vehicle 110, a host satellite operations center (SOC) 150, and a hosted payload (HoP) operation center (HOC) 160 are shown. Various different types of vehicles may be employed for the vehicle 110 including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle 110, it should be noted that satellites typically include computer-controlled systems. A satellite generally includes a bus and a payload (e.g., a host payload 106 and/or a hosted payload(s) 105). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. It should be noted that, in one or more embodiments, the satellite (i.e. the vehicle 110) comprises multiple separate payloads, which are a host payload 106 and a hosted payload(s) 105. Different entities may use the different payloads on the satellite. For example, a host user (e.g., an owner of the satellite) may utilize the host payload 106, and the host user may lease out the hosted payload 105 to a hosted user (e.g., a customer) that utilizes the hosted payload 105.

Leasing a payload(s) (e.g., a hosted payload(s)) to a customer(s) may increase the revenues that a user (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the host SOC 150 encrypts unencrypted host commands (i.e. Unencrypted SOC Commands), by utilizing a host communication security (COMSEC) variety, to produce encrypted host commands (i.e. encrypted SOC Commands). The host commands are commands that are used to configure the host payload 106 that is utilized by the host SOC 150. It should be noted that the host COMSEC variety may include at least one encryption key and/or at least one algorithm (e.g., a Type 1 encryption algorithm or a Type 2 encryption algorithm).

The host SOC 150 then transmits 115 the encrypted host commands to a host ground antenna 116. Then, the host ground antenna 116 transmits 120 the encrypted host commands to a command antenna 121 on the vehicle 110. The host ground antenna 116 transmits 120 the encrypted host commands utilizing an out-of-band frequency band(s) (i.e. a frequency band(s) that is not the same frequency band(s) utilized to transmit payload data). The command antenna 121 on the vehicle 110 then transmits 122 the encrypted host commands to a command receiver 135.

The command receiver 135 then transmits 152 the encrypted host commands to a host communication security module 162. The host communication security module 162 decrypts the encrypted host commands utilizing the host COMSEC variety to generate unencrypted host commands.

It should be noted that the host communication security module 162 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 162 may comprise one or more processors.

The host communication security module 162 then transmits 170 the unencrypted host commands to the host payload 106. The host payload 106 is reconfigured according to the unencrypted host commands. The reconfiguring of the host payload 106 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the host payload 106 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload comprises 106 one or more processors.

After the host payload 106 is reconfigured, a host payload antenna 107 then transmits (e.g., in one or more antenna beams 108) host user data to a host user antenna 185 on the ground. It should be noted that in other embodiments, the host user antenna 185 may be airborne (e.g., located on an aircraft or satellite) or marine (e.g., located on a ship) rather than terrestrial (e.g., located on the ground) as is shown in FIG. 1. The host communication security module 162 then transmits 171 the unencrypted host commands to the hosted payload 105 to command the hosted payload 105 on or off according to the unencrypted host commands.

Also, it should be noted that, although in FIG. 1, antenna beam 108 is shown to include a single circular spot beam; in other embodiments, the antenna beam 108 may include more than one beam as is shown in FIG. 1 (e.g., antenna beam 108 may include multiple beams, and antenna beam 108 may include beams of different shapes than the circular spot beam as is shown in FIG. 1 (e.g., antenna beam 108 may include elliptical beams and/or shaped beams of various different shapes).

It should be noted that in one or more embodiments, the host payload antenna 107 may comprise one or more reflector dishes including, but not limited to, parabolic reflectors and/or shaped reflectors. In some embodiments, the host payload antenna 107 may comprise one or more multifeed antenna arrays.

The host payload 106 transmits 109 unencrypted host telemetry (i.e. unencrypted SOC Telemetry, which is telemetry data related to the host payload 106 that is utilized by the host SOC 150) to the host communication security module 162. The host communication security module 162 then encrypts the unencrypted host telemetry utilizing the host COMSEC variety to generate encrypted host telemetry (i.e. encrypted SOC Telemetry).

The host communication security module 162 then transmits 193 the encrypted host telemetry to a telemetry transmitter 194. The telemetry transmitter 194 then transmits 195 the encrypted host telemetry to a telemetry antenna 196. The telemetry antenna 196 then transmits 197 the encrypted host telemetry to the host ground antenna 116. The telemetry antenna 196 transmits 197 the encrypted host telemetry utilizing an out-of-band frequency band(s). The host ground antenna 116 transmits 198 the encrypted host telemetry to the host SOC 150. The host SOC 150 then decrypts the encrypted host telemetry utilizing the host COMSEC variety to generate the unencrypted host telemetry.

The HOC 160 encrypts unencrypted hosted commands (i.e. Unencrypted HOC Commands), by utilizing a hosted communication security (COMSEC) variety, to produce encrypted hosted commands (i.e. encrypted HOC Commands). The hosted commands are commands that are used to configure the hosted payload 105 that is utilized by the HOC 160. It should be noted that the hosted COMSEC variety may include at least one encryption key and/or at least one algorithm (e.g., a Type 1 encryption algorithm or a Type 2 encryption algorithm).

The HOC 160 then transmits 126 the encrypted hosted commands to a hosted gateway antenna 127. Then, the hosted gateway antenna 127 transmits 125 the encrypted hosted commands to a hosted payload antenna 180 on the vehicle 110. The hosted gateway antenna 127 transmits 125 the encrypted hosted commands utilizing an inband frequency band(s) (i.e. a frequency band(s) that is the same frequency band(s) utilized to transmit payload data). The hosted payload antenna 180 on the vehicle 110 then transmits 182 the encrypted hosted commands to a processor 183 on the hosted payload 105. In one or more embodiments, the hosted processor 183 comprises one or more processors. The hosted processor 183 transmits 184 the encrypted hosted commands to a hosted communication security module 165. The hosted communication security module 165 decrypts the encrypted hosted commands utilizing the hosted COMSEC variety to generate unencrypted hosted commands.

It should be noted that the hosted communication security module 165 may comprise one or more communication security modules (e.g., communication security module 3 and communication security module 4, where communication security module 4 is a redundant communication security module that is utilized when there is a failure of communication security module 3), where the extra communication security modules are redundant communication security modules that are utilized when there is a communication security module failure. In addition, the hosted communication security module 165 may comprise one or more processors. In some embodiments, the hosted communication security module 165 and the hosted processor 183 are separate units, as is shown in FIG. 1. In other embodiments, the hosted communication security module 165 and the hosted processor 183 are a single unit.

The hosted communication security module 165 then transmits 186 the unencrypted hosted commands to the hosted processor 183. The hosted payload 105 is reconfigured by the hosted processor 183 according to the unencrypted hosted commands. The reconfiguring of the hosted payload 105 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the hosted payload 105 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. After the hosted payload 105 is reconfigured, a hosted payload antenna 180 then transmits (e.g., in one or more antenna beams 181) hosted user data to a hosted user antenna 190 on the ground. It should be noted that in other embodiments, the hosted user antenna 190 may be airborne (e.g., located on an aircraft or satellite) or marine (e.g., located on a ship) rather than terrestrial (e.g., located on the ground) as is shown in FIG. 1.

Also, it should be noted that, although in FIG. 1, antenna beam 181 is shown to include a single circular spot beam; in other embodiments, the antenna beam 181 may include more than one beam as is shown in FIG. 1 (e.g., antenna beam 181 may include multiple beams, and antenna beam 181 may include beams of different shapes than the circular spot beam as is shown in FIG. 1 (e.g., antenna beam 181 may include elliptical beams and/or shaped beams of various different shapes).

It should be noted that in one or more embodiments, the hosted payload antenna 180 may comprise one or more reflector dishes including, but not limited to, parabolic reflectors and/or shaped reflectors. In some embodiments, the host payload antenna 180 may comprise one or more multifeed antenna arrays.

The hosted processor 183 transmits 187 unencrypted hosted telemetry (i.e. unencrypted HOC Telemetry, which is telemetry data related to the hosted payload 105 that is utilized by the HOC 160) to the hosted communication security module 165. The hosted communication security module 165 then encrypts the unencrypted hosted telemetry utilizing the hosted COMSEC variety to generate encrypted hosted telemetry (i.e. encrypted HOC Telemetry).

The hosted communication security module 165 then transmits 188 the encrypted hosted telemetry to the hosted processor 183. The hosted processor 183 then transmits 189 the encrypted hosted telemetry to the hosted payload antenna 180. The hosted payload antenna 180 then transmits 191 the encrypted hosted telemetry to the hosted gateway antenna 127. The hosted payload antenna 180 transmits 191 the encrypted hosted telemetry utilizing an inband frequency band(s). The hosted gateway antenna 127 transmits 192 the encrypted hosted telemetry to the HOC 160. The HOC 160 then decrypts the encrypted hosted telemetry utilizing the hosted COMSEC variety to generate the unencrypted hosted telemetry.

FIGS. 2A, 2B, 2C, 2D, 2E, and 2F together show a flow chart for the disclosed method for secured independent hosted payload operations, where the host commanding and host telemetry are both transmitted out-of-band, in accordance with at least one embodiment of the present disclosure. At the start 200 of the method, a host satellite operations center (SOC) encrypts unencrypted host commands by utilizing a host communication security (COMSEC) variety to produce encrypted host commands 202. Then, the host SOC transmits the encrypted host commands to a host ground antenna 204. The host ground antenna then receives the encrypted host commands 206. Then, the host ground antenna transmits the encrypted host commands to a command antenna on a vehicle 208. The command antenna then receives the encrypted host commands 210. Then, the command antenna transmits the encrypted host commands to a command receiver 212. The command receiver then receives the encrypted host commands 214. Then, the command receiver transmits the encrypted host commands to a host communication security module 216.

The host communication security module then receives the encrypted host commands 218. Then, the host communication security module decrypts the encrypted host commands by utilizing the host COMSEC variety to produce the unencrypted host commands 220. The host communication security module then transmits the unencrypted host commands to a host payload and a hosted payload 222. Then, the hosted payload is commanded on or off according to the unencrypted host commands 224. The host payload then receives the unencrypted host commands 226. Then, the host payload is reconfigured according to the unencrypted host commands 228. A host payload antenna then transmits host user data to a host user antenna 230. Then, the host user antenna receives the host user data 232. The host payload then transmits unencrypted host payload telemetry to the host communication security module 234.

Then, the host communication security module receives the unencrypted host payload telemetry 236. The host communication security module then encrypts the unencrypted host payload telemetry by utilizing the host COMSEC variety to produce encrypted host payload telemetry 238. Then, the host communication security module transmits the encrypted host payload telemetry to a telemetry transmitter 240. The telemetry transmitter then receives the encrypted host payload telemetry 242. Then, the telemetry transmitter transmits the encrypted host payload telemetry to a telemetry antenna 244. The telemetry antenna then transmits the encrypted host payload telemetry to the host ground antenna 246. Then, the host ground antenna receives the encrypted host payload telemetry 248. The host ground antenna then transmits the encrypted host payload telemetry to the host SOC 250. Then, the host SOC decrypts the host payload telemetry by utilizing the host COMSEC variety to produce the unencrypted host payload telemetry 252.

A hosted payload (HoP) operation center (HOC) encrypts unencrypted hosted commands by utilizing a hosted COMSEC variety to produce encrypted hosted commands 254. Then, the HOC transmits the encrypted hosted commands to a hosted gateway antenna 256. The hosted gateway antenna then receives the encrypted hosted commands 258. Then, the hosted gateway antenna transmits the encrypted hosted commands to a hosted payload antenna on the vehicle 260. The hosted payload antenna then receives the encrypted hosted commands 262. Then, the hosted payload antenna transmits the encrypted hosted commands to a hosted processor on a hosted payload 264. The hosted processor then receives the encrypted hosted commands 266. Then, the hosted processor transmits the encrypted hosted commands to a hosted communication security module 268.

The hosted communication security module then receives the encrypted hosted commands 270. Then, the hosted communication security module decrypts the encrypted hosted commands by utilizing the hosted COMSEC variety to produce the unencrypted hosted commands 272. The hosted communication security module then transmits the unencrypted hosted commands to the hosted processor 274. Then, the hosted processor receives the unencrypted hosted commands 276. The hosted processor then reconfigures the hosted payload according to the unencrypted hosted commands 278. Then, the hosted payload antenna transmits hosted user data to a hosted user antenna 280. The hosted user antenna then receives the hosted user data 282. Then, the hosted processor transmits unencrypted hosted payload telemetry to the hosted communication security module 284.

The hosted communication security module then receives the unencrypted hosted payload telemetry 286. Then, the hosted communication security module encrypts the unencrypted hosted payload telemetry by utilizing the hosted COMSEC variety to produce encrypted hosted payload telemetry 288. The hosted communication security module then transmits the encrypted hosted payload telemetry to the hosted processor 290. Then, the hosted processor receives the encrypted hosted telemetry 291. The hosted processor then transmits the encrypted hosted telemetry to the hosted payload antenna 292. Then, the hosted payload antenna receives the encrypted hosted telemetry 293. The hosted payload antenna then transmits the encrypted hosted telemetry to the hosted gateway antenna 294. Then, the hosted gateway antenna receives the encrypted hosted telemetry 295. The hosted gateway antenna then transmits the encrypted hosted telemetry to the HOC 296. Then, the HOC receives the encrypted hosted telemetry 297. The HOC then decrypts the encrypted hosted telemetry by utilizing the hosted COMSEC variety to produce the unencrypted hosted telemetry 298. Then, the method ends 299.

FIG. 3 is a diagram 300 showing the disclosed system for secured independent hosted payload operations, where the host commanding is transmitted out-of-band and the host telemetry is transmitted inband, in accordance with at least one embodiment of the present disclosure. In this figure, a vehicle 310, a host satellite operations center (SOC) 350, and a hosted payload (HoP) operation center (HOC) 360 are shown. Various different types of vehicles may be employed for the vehicle 310 including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle 310, it should be noted that satellites typically include computer-controlled systems. A satellite generally includes a bus and a payload (e.g., a host payload 306 and/or a hosted payload(s) 305). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. It should be noted that, in one or more embodiments, the satellite (i.e. the vehicle 310) comprises multiple separate payloads, which are a host payload 306 and a hosted payload(s) 305. Different entities may use the different payloads on the satellite. For example, a host user (e.g., an owner of the satellite) may utilize the host payload 306, and the host user may lease out the hosted payload 305 to a hosted user (e.g., a customer) that utilizes the hosted payload 305.

Leasing a payload(s) (e.g., a hosted payload(s)) to a customer(s) may increase the revenues that a user (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the host SOC 350 encrypts unencrypted host commands (i.e. Unencrypted SOC Commands), by utilizing a host communication security (COMSEC) variety, to produce encrypted host commands (i.e. encrypted SOC Commands). The host commands are commands that are used to configure the host payload 306 that is utilized by the host SOC 350. It should be noted that the host COMSEC variety may include at least one encryption key and/or at least one algorithm (e.g., a Type 1 encryption algorithm or a Type 2 encryption algorithm).

The host SOC 350 then transmits 315 the encrypted host commands to a host ground antenna 316. Then, the host ground antenna 316 transmits 320 the encrypted host commands to a command antenna 321 on the vehicle 310. The host ground antenna 316 transmits 320 the encrypted host commands utilizing an out-of-band frequency band(s) (i.e. a frequency band(s) that is not the same frequency band(s) utilized to transmit payload data). The command antenna 321 on the vehicle 310 then transmits 322 the encrypted host commands to a command receiver 335.

The command receiver 335 then transmits 352 the encrypted host commands to a host communication security module 362. The host communication security module 362 decrypts the encrypted host commands utilizing the host COMSEC variety to generate unencrypted host commands.

It should be noted that the host communication security module 362 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 362 may comprise one or more processors.

The host communication security module 362 then transmits 370 the unencrypted host commands to the host payload 306. The host payload 306 is reconfigured according to the unencrypted host commands. The reconfiguring of the host payload 306 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the host payload 306 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload comprises 306 one or more processors.

After the host payload 306 is reconfigured, a host payload antenna 307 then transmits (e.g., in one or more antenna beams 308) host user data to a host user antenna 385 on the ground. It should be noted that in other embodiments, the host user antenna 385 may be airborne (e.g., located on an aircraft or satellite) or marine (e.g., located on a ship) rather than terrestrial (e.g., located on the ground) as is shown in FIG. 3. The host communication security module 362 then transmits 371 the unencrypted host commands to the hosted payload 305 to command the hosted payload 305 on or off according to the unencrypted host commands.

Also, it should be noted that, although in FIG. 3, antenna beam 308 is shown to include a single circular spot beam; in other embodiments, the antenna beam 308 may include more than one beam as is shown in FIG. 3 (e.g., antenna beam 308 may include multiple beams, and antenna beam 308 may include beams of different shapes than the circular spot beam as is shown in FIG. 3 (e.g., antenna beam 308 may include elliptical beams and/or shaped beams of various different shapes).

It should be noted that in one or more embodiments, the host payload antenna 307 may comprise one or more reflector dishes including, but not limited to, parabolic reflectors and/or shaped reflectors. In some embodiments, the host payload antenna 307 may comprise one or more multifeed antenna arrays.

The host payload 306 transmits 309 unencrypted host telemetry (i.e. unencrypted SOC Telemetry, which is telemetry data related to the host payload 306 that is utilized by the host SOC 350) to the host communication security module 362. The host communication security module 362 then encrypts the unencrypted host telemetry utilizing the host COMSEC variety to generate encrypted host telemetry (i.e. encrypted SOC Telemetry).

The host communication security module 362 then transmits 393 the encrypted host telemetry to the host payload 306. The host payload 306 then transmits 322 the encrypted host telemetry to the host payload antenna 307. The host payload antenna 307 then transmits 397 the encrypted host telemetry to a SOC ground antenna 317. The host payload antenna 307 transmits 397 the encrypted host telemetry utilizing an inband frequency band(s). It should be noted that, although in FIG. 3 the host SOC 350 is depicted to have its SOC ground antenna 317 located right next to its operations building; in other embodiments, the host SOC 350 may have its SOC ground antenna 317 located very far away from the its operations building (e.g., the ground antenna may be located in another country than the operations building). The host SOC 350 then decrypts the encrypted host telemetry utilizing the host COMSEC variety to generate the unencrypted host telemetry.

The HOC 360 encrypts unencrypted hosted commands (i.e. Unencrypted HOC Commands), by utilizing a hosted communication security (COMSEC) variety, to produce encrypted hosted commands (i.e. encrypted HOC Commands). The hosted commands are commands that are used to configure the hosted payload 305 that is utilized by the HOC 360. It should be noted that the hosted COMSEC variety may include at least one encryption key and/or at least one algorithm (e.g., a Type 1 encryption algorithm or a Type 2 encryption algorithm).

The HOC 360 then transmits 326 the encrypted hosted commands to a hosted gateway antenna 327. Then, the hosted gateway antenna 327 transmits 325 the encrypted hosted commands to a hosted payload antenna 380 on the vehicle 310. The hosted gateway antenna 327 transmits 325 the encrypted hosted commands utilizing an inband frequency band(s) (i.e. a frequency band(s) that is the same frequency band(s) utilized to transmit payload data). The hosted payload antenna 380 on the vehicle 310 then transmits 382 the encrypted hosted commands to a processor 383 on the hosted payload 305. In one or more embodiments, the hosted processor 383 comprises one or more processors. The hosted processor 383 transmits 384 the encrypted hosted commands to a hosted communication security module 365. The hosted communication security module 365 decrypts the encrypted hosted commands utilizing the hosted COMSEC variety to generate unencrypted hosted commands.

It should be noted that the hosted communication security module 365 may comprise one or more communication security modules (e.g., communication security module 3 and communication security module 4, where communication security module 4 is a redundant communication security module that is utilized when there is a failure of communication security module 3), where the extra communication security modules are redundant communication security modules that are utilized when there is a communication security module failure. In addition, the hosted communication security module 365 may comprise one or more processors. In some embodiments, the hosted communication security module 365 and the hosted processor 383 are separate units, as is shown in FIG. 3. In other embodiments, the hosted communication security module 365 and the hosted processor 383 are a single unit.

The hosted communication security module 365 then transmits 386 the unencrypted hosted commands to the hosted processor 383. The hosted payload 305 is reconfigured by the hosted processor 383 according to the unencrypted hosted commands. The reconfiguring of the hosted payload 305 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the hosted payload 305 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. After the hosted payload 305 is reconfigured, a hosted payload antenna 380 then transmits (e.g., in one or more antenna beams 381) hosted user data to a hosted user antenna 390 on the ground. It should be noted that in other embodiments, the hosted user antenna 390 may be airborne (e.g., located on an aircraft or satellite) or marine (e.g., located on a ship) rather than terrestrial (e.g., located on the ground) as is shown in FIG. 3.

Also, it should be noted that, although in FIG. 3, antenna beam 381 is shown to include a single circular spot beam; in other embodiments, the antenna beam 381 may include more than one beam as is shown in FIG. 3 (e.g., antenna beam 381 may include multiple beams, and antenna beam 381 may include beams of different shapes than the circular spot beam as is shown in FIG. 3 (e.g., antenna beam 381 may include elliptical beams and/or shaped beams of various different shapes).

It should be noted that in one or more embodiments, the hosted payload antenna 380 may comprise one or more reflector dishes including, but not limited to, parabolic reflectors and/or shaped reflectors. In some embodiments, the host payload antenna 380 may comprise one or more multifeed antenna arrays.

The hosted processor 383 transmits 387 unencrypted hosted telemetry (i.e. unencrypted HOC Telemetry, which is telemetry data related to the hosted payload 305 that is utilized by the HOC 360) to the hosted communication security module 365. The hosted communication security module 365 then encrypts the unencrypted hosted telemetry utilizing the hosted COMSEC variety to generate encrypted hosted telemetry (i.e. encrypted HOC Telemetry).

The hosted communication security module 365 then transmits 388 the encrypted hosted telemetry to the hosted processor 383. The hosted processor 383 then transmits 389 the encrypted hosted telemetry to the hosted payload antenna 380. The hosted payload antenna 380 then transmits 391 the encrypted hosted telemetry to the hosted gateway antenna 327. The hosted payload antenna 380 transmits 391 the encrypted hosted telemetry utilizing an inband frequency band(s). The hosted gateway antenna 327 transmits 392 the encrypted hosted telemetry to the HOC 360. The HOC 360 then decrypts the encrypted hosted telemetry utilizing the hosted COMSEC variety to generate the unencrypted hosted telemetry.

FIGS. 4A, 4B, 4C, 4D, 4E, and 4F together show a flow chart for the disclosed method for secured independent hosted payload operations, where the host commanding is transmitted out-of-band and the host telemetry is transmitted inband, in accordance with at least one embodiment of the present disclosure. At the start 400 of the method, a host satellite operations center (SOC) encrypts unencrypted host commands by utilizing a host communication security (COMSEC) variety to produce encrypted host commands 402. Then, the host SOC transmits the encrypted host commands to a host ground antenna 404. The host ground antenna then receives the encrypted host commands 406. Then, the host ground antenna transmits the encrypted host commands to a command antenna on a vehicle 408. The command antenna then receives the encrypted host commands 410. Then, the command antenna transmits the encrypted host commands to a command receiver 412. The command receiver then receives the encrypted host commands 414. Then, the command receiver transmits the encrypted host commands to a host communication security module 416.

The host communication security module then receives the encrypted host commands 418. Then, the host communication security module decrypts the encrypted host commands by utilizing the host COMSEC variety to produce the unencrypted host commands 420. The host communication security module then transmits the unencrypted host commands to a host payload and a hosted payload 422. The hosted payload is then commanded on or off according to the unencrypted host commands 424. Then, the host payload receives the unencrypted host commands 426. The host payload is then reconfigured according to the unencrypted host commands 428. Then, a host payload antenna transmits host user data to a host user antenna 430. The host user antenna then receives the host user data 432. Then, the host payload transmits unencrypted host payload telemetry to the host communication security module 434.

The host communication security module then receives the unencrypted host payload telemetry 436. Then, the host communication security module encrypts the unencrypted host payload telemetry by utilizing the host COMSEC variety to produce encrypted host payload telemetry 438. The host communication security module then transmits the encrypted host payload telemetry to the host payload 440. Then, the host payload receives the encrypted host payload telemetry 442. The host payload then transmits the encrypted host payload telemetry to the host payload antenna 444. Then, the host payload antenna transmits the encrypted host payload telemetry to a SOC ground antenna 446. The SOC ground antenna then receives the encrypted host payload telemetry 448. Then, the SOC ground antenna transmits the encrypted host payload telemetry to the host SOC 450. The host SOC then decrypts the host payload telemetry by utilizing the host COMSEC variety to produce the unencrypted host payload telemetry 452.

A hosted payload (HoP) operation center (HOC) encrypts unencrypted hosted commands by utilizing a hosted COMSEC variety to produce encrypted hosted commands 454. Then, the HOC transmits the encrypted hosted commands to a hosted gateway antenna 456. The hosted gateway antenna then receives the encrypted hosted commands 458. Then, the hosted gateway antenna transmits the encrypted hosted commands to a hosted payload antenna on the vehicle 460. The hosted payload antenna then receives the encrypted hosted commands 462. Then, the hosted payload antenna transmits the encrypted hosted commands to a hosted processor on a hosted payload 464. The hosted processor then receives the encrypted hosted commands 466. Then, the hosted processor transmits the encrypted hosted commands to a hosted communication security module 468.

The hosted communication security module the receives the encrypted hosted commands 470. Then, the hosted communication security module decrypts the encrypted hosted commands by utilizing the hosted COMSEC variety to produce the unencrypted hosted commands 472. The hosted communication security module then transmits the unencrypted hosted commands to the hosted processor 474. Then, the hosted processor receives the unencrypted hosted commands 476. The hosted processor then reconfigures the hosted payload according to the unencrypted hosted commands 478. Then, the hosted payload antenna transmits hosted user data to a hosted user antenna 480. The hosted user antenna then receives the hosted user data 482. Then, the hosted processor transmits unencrypted hosted payload telemetry to the hosted communication security module 484.

The hosted communication security module then receives the unencrypted hosted payload telemetry 486. Then, the hosted communication security module encrypts the unencrypted hosted payload telemetry by utilizing the hosted COMSEC variety to produce encrypted hosted payload telemetry 488. The hosted communication security module then transmits the encrypted hosted payload telemetry to the hosted processor 490. Then, the hosted processor receives the encrypted hosted telemetry 491. The hosted processor then transmits the encrypted hosted telemetry to the hosted payload antenna 492. Then, the hosted payload antenna receives the encrypted hosted telemetry 493. The hosted payload antenna then transmits the encrypted hosted telemetry to the hosted gateway antenna 494. Then, the hosted gateway antenna receives the encrypted hosted telemetry 495. The hosted gateway antenna then transmits the encrypted hosted telemetry to the HOC 496. Then, the HOC receives the encrypted hosted telemetry 497. The HOC then decrypts the encrypted hosted telemetry by utilizing the hosted COMSEC variety to produce the unencrypted hosted telemetry 498. Then, the method ends 499.

FIG. 5 is a diagram 500 showing the disclosed system for secured independent hosted payload operations, where the host commanding is transmitted inband and the host telemetry is transmitted out-of-band, in accordance with at least one embodiment of the present disclosure. In this figure, a vehicle 510, a host satellite operations center (SOC) 550, and a hosted payload (HoP) operation center (HOC) 560 are shown. Various different types of vehicles may be employed for the vehicle 510 including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle 510, it should be noted that satellites typically include computer-controlled systems. A satellite generally includes a bus and a payload (e.g., a host payload 506 and/or a hosted payload(s) 505). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. It should be noted that, in one or more embodiments, the satellite (i.e. the vehicle 510) comprises multiple separate payloads, which are a host payload 506 and a hosted payload(s) 505. Different entities may use the different payloads on the satellite. For example, a host user (e.g., an owner of the satellite) may utilize the host payload 506, and the host user may lease out the hosted payload 505 to a hosted user (e.g., a customer) that utilizes the hosted payload 505.

Leasing a payload(s) (e.g., a hosted payload(s)) to a customer(s) may increase the revenues that a user (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the host SOC 550 encrypts unencrypted host commands (i.e. Unencrypted SOC Commands), by utilizing a host communication security (COMSEC) variety, to produce encrypted host commands (i.e. encrypted SOC Commands). The host commands are commands that are used to configure the host payload 506 that is utilized by the host SOC 550. It should be noted that the host COMSEC variety may include at least one encryption key and/or at least one algorithm (e.g., a Type 1 encryption algorithm or a Type 2 encryption algorithm).

Then, the SOC ground antenna 517 transmits 520 the encrypted host commands to a host payload antenna 507 on the vehicle 510. The SOC ground antenna 517 transmits 520 the encrypted host commands utilizing an inband frequency band(s) (i.e. a frequency band(s) that is the same frequency band(s) utilized to transmit payload data). It should be noted that, although in FIG. 5 the host SOC 550 is depicted to have its SOC ground antenna 517 located right next to its operations building; in other embodiments, the host SOC 550 may have its SOC ground antenna 517 located very far away from the its operations building (e.g., the ground antenna may be located in another country than the operations building). The host payload antenna 507 on the vehicle 510 then transmits 522 the encrypted host commands to the host payload 506.

The host payload 506 then transmits 552 the encrypted host commands to a host communication security module 562. The host communication security module 562 decrypts the encrypted host commands utilizing the host COMSEC variety to generate unencrypted host commands.

It should be noted that the host communication security module 562 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 562 may comprise one or more processors.

The host communication security module 562 then transmits 570 the unencrypted host commands to the host payload 506. The host payload 506 is reconfigured according to the unencrypted host commands. The reconfiguring of the host payload 506 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the host payload 506 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload comprises 506 one or more processors.

After the host payload 506 is reconfigured, a host payload antenna 507 then transmits (e.g., in one or more antenna beams 508) host user data to a host user antenna 585 on the ground. It should be noted that in other embodiments, the host user antenna 585 may be airborne (e.g., located on an aircraft or satellite) or marine (e.g., located on a ship) rather than terrestrial (e.g., located on the ground) as is shown in FIG. 5. The host communication security module 562 then transmits 571 the unencrypted host commands to the hosted payload 505 to command the hosted payload 505 on or off according to the unencrypted host commands.

Also, it should be noted that, although in FIG. 5, antenna beam 508 is shown to include a single circular spot beam; in other embodiments, the antenna beam 508 may include more than one beam as is shown in FIG. 5 (e.g., antenna beam 508 may include multiple beams, and antenna beam 508 may include beams of different shapes than the circular spot beam as is shown in FIG. 5 (e.g., antenna beam 508 may include elliptical beams and/or shaped beams of various different shapes).

It should be noted that in one or more embodiments, the host payload antenna 507 may comprise one or more reflector dishes including, but not limited to, parabolic reflectors and/or shaped reflectors. In some embodiments, the host payload antenna 507 may comprise one or more multifeed antenna arrays.

The host payload 506 transmits 509 unencrypted host telemetry (i.e. unencrypted SOC Telemetry, which is telemetry data related to the host payload 506 that is utilized by the host SOC 550) to the host communication security module 562. The host communication security module 562 then encrypts the unencrypted host telemetry utilizing the host COMSEC variety to generate encrypted host telemetry (i.e. encrypted SOC Telemetry).

The host communication security module 562 then transmits 593 the encrypted host telemetry to a telemetry transmitter 594. The telemetry transmitter 594 then transmits 595 the encrypted host telemetry to a telemetry antenna 596. The telemetry antenna 596 then transmits 597 the encrypted host telemetry to the host ground antenna 516. The telemetry antenna 596 transmits 597 the encrypted host telemetry utilizing an out-of-band frequency band(s). The host ground antenna 516 transmits 598 the encrypted host telemetry to the host SOC 550. The host SOC 550 then decrypts the encrypted host telemetry utilizing the host COMSEC variety to generate the unencrypted host telemetry.

The HOC 560 encrypts unencrypted hosted commands (i.e. Unencrypted HOC Commands), by utilizing a hosted communication security (COMSEC) variety, to produce encrypted hosted commands (i.e. encrypted HOC Commands). The hosted commands are commands that are used to configure the hosted payload 505 that is utilized by the HOC 560. It should be noted that the hosted COMSEC variety may include at least one encryption key and/or at least one algorithm (e.g., a Type 1 encryption algorithm or a Type 2 encryption algorithm).

The HOC 560 then transmits 526 the encrypted hosted commands to a hosted gateway antenna 527. Then, the hosted gateway antenna 527 transmits 525 the encrypted hosted commands to a hosted payload antenna 580 on the vehicle 510. The hosted gateway antenna 527 transmits 525 the encrypted hosted commands utilizing an inband frequency band(s) (i.e. a frequency band(s) that is the same frequency band(s) utilized to transmit payload data). The hosted payload antenna 580 on the vehicle 510 then transmits 582 the encrypted hosted commands to a processor 583 on the hosted payload 505. In one or more embodiments, the hosted processor 583 comprises one or more processors. The hosted processor 583 transmits 584 the encrypted hosted commands to a hosted communication security module 565. The hosted communication security module 565 decrypts the encrypted hosted commands utilizing the hosted COMSEC variety to generate unencrypted hosted commands.

It should be noted that the hosted communication security module 565 may comprise one or more communication security modules (e.g., communication security module 3 and communication security module 4, where communication security module 4 is a redundant communication security module that is utilized when there is a failure of communication security module 3), where the extra communication security modules are redundant communication security modules that are utilized when there is a communication security module failure. In addition, the hosted communication security module 565 may comprise one or more processors. In some embodiments, the hosted communication security module 565 and the hosted processor 583 are separate units, as is shown in FIG. 5. In other embodiments, the hosted communication security module 565 and the hosted processor 583 are a single unit.

The hosted communication security module 565 then transmits 586 the unencrypted hosted commands to the hosted processor 583. The hosted payload 505 is reconfigured by the hosted processor 583 according to the unencrypted hosted commands. The reconfiguring of the hosted payload 505 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the hosted payload 505 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. After the hosted payload 505 is reconfigured, a hosted payload antenna 580 then transmits (e.g., in one or more antenna beams 581) hosted user data to a hosted user antenna 590 on the ground. It should be noted that in other embodiments, the hosted user antenna 590 may be airborne (e.g., located on an aircraft or satellite) or marine (e.g., located on a ship) rather than terrestrial (e.g., located on the ground) as is shown in FIG. 5.

Also, it should be noted that, although in FIG. 5, antenna beam 581 is shown to include a single circular spot beam; in other embodiments, the antenna beam 581 may include more than one beam as is shown in FIG. 5 (e.g., antenna beam 581 may include multiple beams, and antenna beam 581 may include beams of different shapes than the circular spot beam as is shown in FIG. 5 (e.g., antenna beam 581 may include elliptical beams and/or shaped beams of various different shapes).

It should be noted that in one or more embodiments, the hosted payload antenna 580 may comprise one or more reflector dishes including, but not limited to, parabolic reflectors and/or shaped reflectors. In some embodiments, the host payload antenna 580 may comprise one or more multifeed antenna arrays.

The hosted processor 583 transmits 587 unencrypted hosted telemetry (i.e. unencrypted HOC Telemetry, which is telemetry data related to the hosted payload 505 that is utilized by the HOC 560) to the hosted communication security module 565. The hosted communication security module 565 then encrypts the unencrypted hosted telemetry utilizing the hosted COMSEC variety to generate encrypted hosted telemetry (i.e. encrypted HOC Telemetry).

The hosted communication security module 565 then transmits 588 the encrypted hosted telemetry to the hosted processor 583. The hosted processor 583 then transmits 589 the encrypted hosted telemetry to the hosted payload antenna 580. The hosted payload antenna 580 then transmits 591 the encrypted hosted telemetry to the hosted gateway antenna 527. The hosted payload antenna 580 transmits 591 the encrypted hosted telemetry utilizing an inband frequency band(s). The hosted gateway antenna 527 transmits 592 the encrypted hosted telemetry to the HOC 560. The HOC 560 then decrypts the encrypted hosted telemetry utilizing the hosted COMSEC variety to generate the unencrypted hosted telemetry.

FIGS. 6A, 6B, 6C, 6D, 6E, and 6F together show a flow chart for the disclosed method for secured independent hosted payload operations, where the host commanding is transmitted inband and the host telemetry is transmitted out-of-band, in accordance with at least one embodiment of the present disclosure. At the start 600 of the method, a host satellite operations center (SOC) encrypts unencrypted host commands by utilizing a host communication security (COMSEC) variety to produce encrypted host commands 602. Then, the host SOC transmits the encrypted host commands to a SOC ground antenna 604. The SOC ground antenna then receives the encrypted host commands 606. Then, the SOC ground antenna transmits the encrypted host commands to a host payload antenna on a vehicle 608. The host payload antenna then receives the encrypted host commands 610. Then, the host payload antenna transmits the encrypted host commands to a host payload 612. The host payload then receives the encrypted host commands 614. Then, the host payload transmits the encrypted host commands to a host communication security module 616.

The host communication security module then receives the encrypted host commands 618. Then, the host communication security module decrypts the encrypted host commands by utilizing the host COMSEC variety to produce the unencrypted host commands 620. The host communication security module then transmits the unencrypted host commands to a host payload and a hosted payload 622. Then, the hosted payload is commanded on or off according to the unencrypted host commands 624. The host payload then receives the unencrypted host commands 626. Then, the host payload is reconfigured according to the unencrypted host commands 628. A host payload antenna then transmits host user data to a host user antenna 630. Then, the host user antenna receives the host user data 632. The host payload then transmits unencrypted host payload telemetry to the host communication security module 634.

Then, the host communication security module receives the unencrypted host payload telemetry 636. The host communication security module then encrypts the unencrypted host payload telemetry by utilizing the host COMSEC variety to produce encrypted host payload telemetry 638. Then, the host communication security module transits the encrypted host payload telemetry to a telemetry transmitter 640. The telemetry transmitter then receives the encrypted host payload telemetry 642. Then, the telemetry transmitter transmits the encrypted host payload telemetry to a telemetry antenna 644. The telemetry antenna then transmits the encrypted host payload telemetry to a host ground antenna 646. Then, the host ground antenna receives the encrypted host payload telemetry 648. The host ground antenna then transmits the encrypted host payload telemetry to the host SOC 650. Then, the host SOC decrypts the host payload telemetry by utilizing the host COMSEC variety to produce the unencrypted host payload telemetry 652.

A hosted payload (HoP) operation center (HOC) encrypts unencrypted hosted commands by utilizing a hosted COMSEC variety to produce encrypted hosted commands 654. Then, the HOC transmits the encrypted hosted commands to a hosted gateway antenna 656. The hosted gateway antenna then receives the encrypted hosted commands 658. Then, the hosted gateway antenna transmits the encrypted hosted commands to a hosted payload antenna on the vehicle 660. The hosted payload antenna then receives the encrypted hosted commands 662. Then, the hosted payload antenna transmits the encrypted hosted commands to a hosted processor on a hosted payload 664. The hosted processor then receives the encrypted hosted commands 666. Then, the hosted processor transmits the encrypted hosted commands to a hosted communication security module 668.

The hosted communication security module then receives the encrypted hosted commands 670. Then, the hosted communication security module decrypts the encrypted hosted commands by utilizing the hosted COMSEC variety to produce the unencrypted hosted commands 672. The hosted communication security module then transmits the unencrypted hosted commands to the hosted processor 674. Then, the hosted processor receives the unencrypted hosted commands 676. The hosted processor then reconfigures the hosted payload according to the unencrypted hosted commands 678. Then, the hosted payload antenna transmits hosted user data to a hosted user antenna 680. The hosted user antenna then receives the hosted user data 682. Then, the hosted processor transmits unencrypted hosted payload telemetry to the hosted communication security module 684.

The hosted communication security module then receives the unencrypted hosted payload telemetry 686. Then, the hosted communication security module encrypts the unencrypted hosted payload telemetry by utilizing the hosted COMSEC variety to produce encrypted hosted payload telemetry 688. The hosted communication security module then transmits the encrypted hosted payload telemetry to the hosted processor 690. Then, the hosted processor receives the encrypted hosted telemetry 691. The hosted processor then transmits the encrypted hosted telemetry to the hosted payload antenna 692. Then, the hosted payload antenna receives the encrypted hosted telemetry 693. The hosted payload antenna then transmits the encrypted hosted telemetry to the hosted gateway antenna 694. Then, the hosted gateway antenna receives the encrypted hosted telemetry 695. The hosted gateway antenna then transmits the encrypted hosted telemetry to the HOC 696. Then, the HOC receives the encrypted hosted telemetry 697. The HOC then decrypts the encrypted hosted telemetry by utilizing the hosted COMSEC variety to produce the unencrypted hosted telemetry 698. Then, the method ends 699.

FIG. 7 is a diagram 700 showing the disclosed system for secured independent hosted payload operations, where the host commanding and host telemetry are both transmitted inband, in accordance with at least one embodiment of the present disclosure. In this figure, a vehicle 710, a host satellite operations center (SOC) 750, and a hosted payload (HoP) operation center (HOC) 760 are shown. Various different types of vehicles may be employed for the vehicle 710 including, but not limited to, an airborne vehicle. And, various different types of airborne vehicles may be employed for the vehicle including, but not limited to, a satellite, an aircraft, an unmanned aerial vehicle (UAV), and a space plane.

In the case of a satellite being employed for the vehicle 710, it should be noted that satellites typically include computer-controlled systems. A satellite generally includes a bus and a payload (e.g., a host payload 706 and/or a hosted payload(s) 705). The bus may include systems (which include components) that control the satellite. These systems perform tasks, such as power generation and control, thermal control, telemetry, attitude control, orbit control, and other suitable operations.

The payload of the satellite provides functions to users of the satellite. The payload may include antennas, transponders, and other suitable devices. For example, with respect to communications, the payload in a satellite may be used to provide Internet access, telephone communications, radio, television, and/or other types of communications. It should be noted that, in one or more embodiments, the satellite (i.e. the vehicle 710) comprises multiple separate payloads, which are a host payload 706 and a hosted payload(s) 705. Different entities may use the different payloads on the satellite. For example, a host user (e.g., an owner of the satellite) may utilize the host payload 706, and the host user may lease out the hosted payload 705 to a hosted user (e.g., a customer) that utilizes the hosted payload 705.

Leasing a payload(s) (e.g., a hosted payload(s)) to a customer(s) may increase the revenues that a user (e.g., the host user) of a satellite can obtain. Further, a customer may use a subset of the total resources in a satellite for a cost that is less than the cost for the customer to purchase and operate a satellite, to build and operate a satellite, or to lease an entire satellite.

During operation, the host SOC 750 encrypts unencrypted host commands (i.e. Unencrypted SOC Commands), by utilizing a host communication security (COMSEC) variety, to produce encrypted host commands (i.e. encrypted SOC Commands). The host commands are commands that are used to configure the host payload 706 that is utilized by the host SOC 750. It should be noted that the host COMSEC variety may include at least one encryption key and/or at least one algorithm (e.g., a Type 1 encryption algorithm or a Type 2 encryption algorithm).

Then, the host SOC 750 transmits 715 the encrypted host commands to a host ground antenna 716. The host ground antenna 716 transmits 720 the encrypted host commands to a host payload antenna 707 on the vehicle 710. The host ground antenna 716 transmits 720 the encrypted host commands utilizing an inband frequency band(s) (i.e. a frequency band(s) that is the same frequency band(s) utilized to transmit payload data). It should be noted that, although in FIG. 7 the host SOC 750 is depicted to have the host ground antenna 716 located right next to its operations building; in other embodiments, the host SOC 750 may have the host ground antenna 716 located very far away from the its operations building (e.g., the ground antenna may be located in another country than the operations building). The host payload antenna 707 on the vehicle 710 then transmits 722 the encrypted host commands to the host payload 706.

The host payload 706 then transmits 752 the encrypted host commands to a host communication security module 762. The host communication security module 762 decrypts the encrypted host commands utilizing the host COMSEC variety to generate unencrypted host commands.

It should be noted that the host communication security module 762 may comprise one or more communication security modules (e.g., communication security module 1 and communication security module 2, where communication security module 2 is a redundant communication security module that is utilized when there is a failure of communication security module 1), where the extra communication security modules are redundant communication security modules that are utilized when there is a communication security module failure. In addition, the host communication security module 762 may comprise one or more processors.

The host communication security module 762 then transmits 770 the unencrypted host commands to the host payload 706. The host payload 706 is reconfigured according to the unencrypted host commands. The reconfiguring of the host payload 706 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the host payload 706 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. In one or more embodiments, the host payload comprises 706 one or more processors.

After the host payload 706 is reconfigured, a host payload antenna 707 then transmits (e.g., in one or more antenna beams 708) host user data to a host user antenna 785 on the ground. It should be noted that in other embodiments, the host user antenna 785 may be airborne (e.g., located on an aircraft or satellite) or marine (e.g., located on a ship) rather than terrestrial (e.g., located on the ground) as is shown in FIG. 7. The host communication security module 762 then transmits 771 the unencrypted host commands to the hosted payload 705 to command the hosted payload 705 on or off according to the unencrypted host commands.

Also, it should be noted that, although in FIG. 7, antenna beam 708 is shown to include a single circular spot beam; in other embodiments, the antenna beam 708 may include more than one beam as is shown in FIG. 7 (e.g., antenna beam 708 may include multiple beams, and antenna beam 708 may include beams of different shapes than the circular spot beam as is shown in FIG. 7 (e.g., antenna beam 708 may include elliptical beams and/or shaped beams of various different shapes).

It should be noted that in one or more embodiments, the host payload antenna 707 may comprise one or more reflector dishes including, but not limited to, parabolic reflectors and/or shaped reflectors. In some embodiments, the host payload antenna 707 may comprise one or more multifeed antenna arrays.

The host payload 706 transmits 709 unencrypted host telemetry (i.e. unencrypted SOC Telemetry, which is telemetry data related to the host payload 706 that is utilized by the host SOC 750) to the host communication security module 762. The host communication security module 762 then encrypts the unencrypted host telemetry utilizing the host COMSEC variety to generate encrypted host telemetry (i.e. encrypted SOC Telemetry).

The host communication security module 762 then transmits 793 the encrypted host telemetry to the host payload 706. The host payload 706 then transmits 723 the encrypted host telemetry to the host payload antenna 707. The host payload antenna 707 then transmits 797 the encrypted host telemetry to the host ground antenna 716. The host payload antenna 707 transmits 797 the encrypted host telemetry utilizing an inband frequency band(s). The host ground antenna 716 transmits 798 the encrypted host telemetry to the host SOC 750. The host SOC 750 then decrypts the encrypted host telemetry utilizing the host COMSEC variety to generate the unencrypted host telemetry.

The HOC 760 encrypts unencrypted hosted commands (i.e. Unencrypted HOC Commands), by utilizing a hosted communication security (COMSEC) variety, to produce encrypted hosted commands (i.e. encrypted HOC Commands). The hosted commands are commands that are used to configure the hosted payload 705 that is utilized by the HOC 760. It should be noted that the hosted COMSEC variety may include at least one encryption key and/or at least one algorithm (e.g., a Type 1 encryption algorithm or a Type 2 encryption algorithm).

The HOC 760 then transmits 726 the encrypted hosted commands to a hosted gateway antenna 727. Then, the hosted gateway antenna 727 transmits 725 the encrypted hosted commands to a hosted payload antenna 780 on the vehicle 710. The hosted gateway antenna 727 transmits 725 the encrypted hosted commands utilizing an inband frequency band(s) (i.e. a frequency band(s) that is the same frequency band(s) utilized to transmit payload data). The hosted payload antenna 780 on the vehicle 710 then transmits 782 the encrypted hosted commands to a processor 783 on the hosted payload 705. In one or more embodiments, the hosted processor 783 comprises one or more processors. The hosted processor 783 transmits 784 the encrypted hosted commands to a hosted communication security module 765. The hosted communication security module 765 decrypts the encrypted hosted commands utilizing the hosted COMSEC variety to generate unencrypted hosted commands.

It should be noted that the hosted communication security module 765 may comprise one or more communication security modules (e.g., communication security module 3 and communication security module 4, where communication security module 4 is a redundant communication security module that is utilized when there is a failure of communication security module 3), where the extra communication security modules are redundant communication security modules that are utilized when there is a communication security module failure. In addition, the hosted communication security module 765 may comprise one or more processors. In some embodiments, the hosted communication security module 765 and the hosted processor 783 are separate units, as is shown in FIG. 7. In other embodiments, the hosted communication security module 765 and the hosted processor 783 are a single unit.

The hosted communication security module 765 then transmits 786 the unencrypted hosted commands to the hosted processor 783. The hosted payload 705 is reconfigured by the hosted processor 783 according to the unencrypted hosted commands. The reconfiguring of the hosted payload 705 may comprise adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering. Additionally, the reconfiguring of the hosted payload 705 may comprise reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix. After the hosted payload 705 is reconfigured, a hosted payload antenna 780 then transmits (e.g., in one or more antenna beams 781) hosted user data to a hosted user antenna 790 on the ground. It should be noted that in other embodiments, the hosted user antenna 170 may be airborne (e.g., located on an aircraft or satellite) or marine (e.g., located on a ship) rather than terrestrial (e.g., located on the ground) as is shown in FIG. 7.

Also, it should be noted that, although in FIG. 7, antenna beam 781 is shown to include a single circular spot beam; in other embodiments, the antenna beam 781 may include more than one beam as is shown in FIG. 7 (e.g., antenna beam 781 may include multiple beams, and antenna beam 781 may include beams of different shapes than the circular spot beam as is shown in FIG. 7 (e.g., antenna beam 781 may include elliptical beams and/or shaped beams of various different shapes).

It should be noted that in one or more embodiments, the hosted payload antenna 780 may comprise one or more reflector dishes including, but not limited to, parabolic reflectors and/or shaped reflectors. In some embodiments, the host payload antenna 780 may comprise one or more multifeed antenna arrays.

The hosted processor 783 transmits 787 unencrypted hosted telemetry (i.e. unencrypted HOC Telemetry, which is telemetry data related to the hosted payload 705 that is utilized by the HOC 760) to the hosted communication security module 765. The hosted communication security module 765 then encrypts the unencrypted hosted telemetry utilizing the hosted COMSEC variety to generate encrypted hosted telemetry (i.e. encrypted HOC Telemetry).

The hosted communication security module 765 then transmits 788 the encrypted hosted telemetry to the hosted processor 783. The hosted processor 783 then transmits 789 the encrypted hosted telemetry to the hosted payload antenna 780. The hosted payload antenna 780 then transmits 791 the encrypted hosted telemetry to the hosted gateway antenna 727. The hosted payload antenna 780 transmits 791 the encrypted hosted telemetry utilizing an inband frequency band(s). The hosted gateway antenna 727 transmits 792 the encrypted hosted telemetry to the HOC 760. The HOC 760 then decrypts the encrypted hosted telemetry utilizing the hosted COMSEC variety to generate the unencrypted hosted telemetry.

FIGS. 8A, 8B, 8C, 8D, 8E, and 8F together show a flow chart for the disclosed method for secured independent hosted payload operations, where the host commanding and host telemetry are both transmitted inband, in accordance with at least one embodiment of the present disclosure. At the start 800 of the method, a host satellite operations center (SOC) encrypts unencrypted host commands by utilizing a host communication security (COMSEC) variety to produce encrypted host commands 802. Then, the host SOC transmits the encrypted host commands to a host ground antenna 804. The host ground antenna then receives the encrypted host commands 806. Then, the host ground antenna transmits the encrypted host commands to a host payload antenna on a vehicle 808. The host payload antenna then receives the encrypted host commands 810. Then, the host payload antenna transmits the encrypted host commands to a host payload 812. The host payload then receives the encrypted host commands 814. Then, the host payload transmits the encrypted host commands to a host communication security module 816.

The host communication security module then receives the encrypted host commands 818. Then, the host communication security module decrypts the encrypted host commands by utilizing the host COMSEC variety to produce the unencrypted host commands 820. The host communication security module then transmits the unencrypted host commands to a host payload and a hosted payload 822. Then, the hosted payload is commanded on or off according to the unencrypted host commands 824. The host payload then receives the unencrypted host commands 826. Then, the host payload is reconfigured according to the unencrypted host commands 828. A host payload antenna then transmits host user data to a host user antenna 830. Then, the host user antenna receives the host user data 832. The host payload then transmits unencrypted host payload telemetry to the host communication security module 834.

Then, the host communication security module receives the unencrypted host payload telemetry 836. The host communication security module then encrypts the unencrypted host payload telemetry by utilizing the host COMSEC variety to produce encrypted host payload telemetry 838. The host communication security module then transmits the encrypted host payload telemetry to the host payload 840. Then, the host payload receives the encrypted host payload telemetry 842. The host payload then transmits the encrypted host payload telemetry to the host payload antenna 844. Then, the host payload antenna transmits the encrypted host payload telemetry to the host ground antenna 846. The host ground antenna then receives the encrypted host payload telemetry 848. Then, the host ground antenna transmits the encrypted host payload telemetry to the host SOC 850. The host SOC then decrypts the host payload telemetry by utilizing the host COMSEC variety to produce the unencrypted host payload telemetry 852.

A hosted payload (HoP) operation center (HOC) encrypts unencrypted hosted commands by utilizing a hosted COMSEC variety to produce encrypted hosted commands 854. Then, the HOC transmits the encrypted hosted commands to a hosted gateway antenna 856. The hosted gateway antenna then receives the encrypted hosted commands 858. Then, the hosted gateway antenna transmits the encrypted hosted commands to a hosted payload antenna on the vehicle 860. The hosted payload antenna then receives the encrypted hosted commands 862. Then, the hosted payload antenna transmits the encrypted hosted commands to a hosted processor on a hosted payload 864. The hosted processor then receives the encrypted hosted commands 866. Then, the hosted processor transmits the encrypted hosted commands to a hosted communication security module 868.

The hosted communication security module then receives the encrypted hosted commands 870. Then, the hosted communication security module decrypts the encrypted hosted commands by utilizing the hosted COMSEC variety to produce the unencrypted hosted commands 872. The hosted communication security module then transmits the unencrypted hosted commands to the hosted processor 874. Then, the hosted processor receives the unencrypted hosted commands 876. The hosted processor is then reconfigured the hosted payload according to the unencrypted hosted commands 878. Then, the hosted payload antenna transmits hosted user data to a hosted user antenna 880. The hosted user antenna then receives the hosted user data 882. Then, the hosted processor transmits unencrypted hosted payload telemetry to the hosted communication security module 884.

The hosted communication security module then receives the unencrypted hosted payload telemetry 886. Then, the hosted communication security module encrypts the unencrypted hosted payload telemetry by utilizing the hosted COMSEC variety to produce encrypted hosted payload telemetry 888. The hosted communication security module then transmits the encrypted hosted payload telemetry to the hosted processor 890. Then, the hosted processor receives the encrypted hosted telemetry 891. The hosted processor then transmits the encrypted hosted telemetry to the hosted payload antenna 892. Then, the hosted payload antenna receives the encrypted hosted telemetry 893. The hosted payload antenna then transmits the encrypted hosted telemetry to the hosted gateway antenna 894. Then, the hosted gateway antenna receives the encrypted hosted telemetry 895. The hosted gateway antenna then transmits the encrypted hosted telemetry to the HOC 896. Then, the HOC receives the encrypted hosted telemetry 897. The HOC then decrypts the encrypted hosted telemetry by utilizing the hosted COMSEC variety to produce the unencrypted hosted telemetry 898. Then, the method ends 899.

Illustrative, non-exclusive examples of inventive subject matter according to the present disclosure are described in the following enumerated paragraphs:

A1. A method for payload operations, the method comprising:

transmitting, by a host satellite operations center (SOC), encrypted host commands, wherein the encrypted host commands are encrypted utilizing a host communication security (COMSEC) variety;

receiving, by a command receiver on a vehicle, the encrypted host commands;

decrypting, by a host communication security module, the encrypted host commands by utilizing the host COMSEC variety to produce unencrypted host commands;

commanding a hosted payload at least one of on or off according to the unencrypted host commands;

reconfiguring a host payload according to the unencrypted host commands;

transmitting, by a host payload antenna, host user data to a host user antenna;

encrypting, by the host communication security module, unencrypted host payload telemetry by utilizing the host COMSEC variety to produce encrypted host payload telemetry;

transmitting, by a telemetry transmitter, the encrypted host payload telemetry;

decrypting, by the host SOC, the host payload telemetry by utilizing the host COMSEC variety to produce the unencrypted host payload telemetry;

encrypting, by a hosted payload (HoP) operation center (HOC), unencrypted hosted commands by utilizing a hosted COMSEC variety to produce encrypted hosted commands;

transmitting, by the HOC, encrypted hosted commands, wherein the encrypted hosted commands are encrypted utilizing a hosted COMSEC variety;

receiving, by a hosted payload antenna on the vehicle, the encrypted hosted commands;

decrypting, by a hosted communication security module on the hosted payload, the encrypted hosted commands by utilizing the hosted COMSEC variety to produce unencrypted hosted commands;

reconfiguring, by a hosted processor on the hosted payload, the hosted payload according to the unencrypted hosted commands;

transmitting, by the hosted payload antenna, hosted user data to a hosted user antenna;

encrypting, by the hosted communication security module, unencrypted hosted payload telemetry by utilizing the hosted COMSEC variety to produce encrypted hosted payload telemetry;

transmitting, by the hosted payload antenna, the encrypted hosted telemetry; and decrypting, by the HOC, the encrypted hosted telemetry by utilizing the hosted COMSEC variety to produce the unencrypted hosted telemetry.

A2. The method of paragraph A1, wherein the hosted processor comprises the hosted communication security module as a single unit.

A3. The method of paragraph A1, wherein the hosted communication security module and the hosted processor are two separate units.

A4. The method of paragraph A1, wherein the hosted processor comprises at least one processor.

A5. The method of paragraph A1, wherein the host payload comprises at least one processor.

A6. The method of paragraph A1, wherein the host communication security module comprises more than one communication security module.

A7. The method of paragraph A6, wherein at least one of the communication security modules is a redundant communication security module.

A8. The method of paragraph A1, wherein the hosted communication security module comprises more than one communication security module.

A9. The method of paragraph A8, wherein at least one of the communication security modules is a redundant communication security module.

A10. The method of paragraph A1, wherein the host payload antenna and the hosted payload antenna each comprise at least one radio frequency (RF) antenna.

A11. The method of paragraph A10, wherein the RF antenna is a reflector antenna.

A12. The method of paragraph A10, wherein the RF antenna is a multi-feed array antenna.

A13. The method of paragraph A1, wherein the reconfiguring of at least one of the host payload or the hosted payload comprises adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

A14. The method of paragraph A1, wherein the reconfiguring of the host payload comprises reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

A15. The method of paragraph A1, wherein the reconfiguring of the hosted payload comprises reconfiguring at least one of: the hosted payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

A16. The method of paragraph A1, wherein the vehicle is an airborne vehicle.

A17. The method of paragraph A16, wherein the airborne vehicle is one of a satellite, an aircraft, an unmanned aerial vehicle (UAV), or a space plane.

B1. A method for payload operations, the method comprising:

transmitting, by a host satellite operations center (SOC), encrypted host commands, wherein the encrypted host commands are encrypted utilizing a host communication security (COMSEC) variety;

receiving, by a command receiver on a vehicle, the encrypted host commands;

decrypting, by a host communication security module, the encrypted host commands by utilizing the host COMSEC variety to produce unencrypted host commands;

commanding a hosted payload at least one of on or off according to the unencrypted host commands;

reconfiguring a host payload according to the unencrypted host commands;

transmitting, by a host payload antenna, host user data to a host user antenna;

encrypting, by the host communication security module, unencrypted host payload telemetry by utilizing the host COMSEC variety to produce encrypted host payload telemetry;

transmitting, by the host payload antenna, the encrypted host payload telemetry;

decrypting, by the host SOC, the host payload telemetry by utilizing the host COMSEC variety to produce the unencrypted host payload telemetry;

transmitting, by a hosted payload (HoP) operation center (HOC), encrypted hosted commands, wherein the encrypted hosted commands are encrypted utilizing a hosted COMSEC variety;

receiving, by the hosted payload antenna on the vehicle, the encrypted hosted commands;

decrypting, by the hosted communication security module on the hosted payload, the encrypted hosted commands by utilizing the hosted COMSEC variety to produce unencrypted hosted commands;

reconfiguring, by a hosted processor on the hosted payload, the hosted payload according to the unencrypted hosted commands;

transmitting, by the hosted payload antenna, hosted user data to a hosted user antenna;

encrypting, by the hosted communication security module, unencrypted hosted payload telemetry utilizing the hosted COMSEC variety to produce encrypted hosted payload telemetry;

transmitting, by the hosted payload antenna, the encrypted hosted telemetry; and decrypting, by the HOC, the encrypted hosted telemetry by utilizing the hosted COMSEC variety to produce the unencrypted hosted telemetry.

C1. A method for payload operations, the method comprising:

transmitting, by a host satellite operations center (SOC), encrypted host commands, wherein the encrypted host commands are encrypted utilizing a host communication security (COMSEC) variety;

receiving, by a host payload antenna on a vehicle, the encrypted host commands;

decrypting, by a host communication security module, the encrypted host commands by utilizing the host COMSEC variety to produce unencrypted host commands;

commanding a hosted payload at least one of on or off according to the unencrypted host commands;

reconfiguring a host payload according to the unencrypted host commands;

transmitting, by a host payload antenna, host user data to a host user antenna;

encrypting, by the host communication security module, unencrypted host payload telemetry by utilizing the host COMSEC variety to produce encrypted host payload telemetry;

transmitting, by a telemetry transmitter, the encrypted host payload telemetry;

decrypting, by the host SOC, the host payload telemetry by utilizing the host COMSEC variety to produce the unencrypted host payload telemetry;

transmitting, by a hosted payload (HoP) operation center (HOC), encrypted hosted commands, wherein the encrypted hosted commands are encrypted utilizing a hosted COMSEC variety;

receiving, by the hosted payload antenna on the vehicle, the encrypted hosted commands;

decrypting, by a hosted communication security module on the hosted payload, the encrypted hosted commands by utilizing the hosted COMSEC variety to produce unencrypted hosted commands;

reconfiguring, by the hosted processor on the hosted payload, the hosted payload according to the unencrypted hosted commands;

transmitting, by the hosted payload antenna, hosted user data to a hosted user antenna;

encrypting, by the hosted communication security module, unencrypted hosted payload telemetry to produce encrypted hosted payload telemetry;

transmitting, by the hosted payload antenna, the encrypted hosted telemetry; and decrypting, by the HOC, the encrypted hosted telemetry by utilizing the hosted COMSEC variety to produce the unencrypted hosted telemetry.

D1. A method for payload operations, the method comprising:

transmitting, by a host satellite operations center (SOC), encrypted host commands, wherein the encrypted host commands are encrypted utilizing a host communication security (COMSEC) variety;

receiving, by a host payload antenna on a vehicle, the encrypted host commands;

decrypting, by a host communication security module, the encrypted host commands by utilizing the host COMSEC variety to produce unencrypted host commands;

commanding a hosted payload at least one of on or off according to the unencrypted host commands;

reconfiguring a host payload according to the unencrypted host commands;

transmitting, by a host payload antenna, host user data to a host user antenna;

encrypting, by the host communication security module, unencrypted host payload telemetry utilizing the host COMSEC variety to produce encrypted host payload telemetry;

transmitting, by the host payload antenna, the encrypted host payload telemetry;

decrypting, by the host SOC, the host payload telemetry by utilizing the host COMSEC variety to produce the unencrypted host payload telemetry;

transmitting, by a hosted payload (HoP) operation center (HOC), encrypted hosted commands, wherein the encrypted hosted commands are encrypted utilizing a hosted COMSEC variety;

receiving, by a hosted payload antenna on the vehicle, the encrypted hosted commands;

decrypting, by a hosted communication security module on the hosted payload, the encrypted hosted commands by utilizing the hosted COMSEC variety to produce unencrypted hosted commands;

reconfiguring, by a hosted processor on the hosted payload, the hosted payload according to the unencrypted hosted commands;

transmitting, by the hosted payload antenna, hosted user data to a hosted user antenna;

encrypting, by the hosted communication security module, unencrypted hosted payload telemetry to produce encrypted hosted payload telemetry;

transmitting, by the hosted payload antenna, the encrypted hosted telemetry; and decrypting, by the HOC, the encrypted hosted telemetry by utilizing the hosted COMSEC variety to produce the unencrypted hosted telemetry.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more parts or less part of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A system for payload operations, the system comprising:
a command receiver on a vehicle to receive encrypted host commands,
wherein unencrypted host commands are encrypted by a host satellite operations center (SOC) utilizing a host communication security (COMSEC) variety to produce the encrypted host commands;
a host communication security module to decrypt the encrypted host commands by utilizing the host COMSEC variety to produce unencrypted host commands, and to transmit the unencrypted host commands to a hosted payload and a host payload;
the hosted payload configured to be commanded at least one of on or off according to the unencrypted host commands;
the host payload reconfigured according to the unencrypted host commands, wherein the host payload and the hosted payload are separate from each other;
a host payload antenna to transmit host user data to a host user antenna;
the host communication security module to encrypt unencrypted host payload telemetry by utilizing the host COMSEC variety to produce encrypted host payload telemetry;
a telemetry transmitter to transmit the encrypted host payload telemetry,
wherein the host SOC decrypts the encrypted host payload telemetry by utilizing the host COMSEC variety to produce the unencrypted host payload telemetry;
a hosted payload antenna on the vehicle to receive encrypted hosted commands, wherein the encrypted hosted commands are transmitted utilizing at least one inband frequency band,
wherein a hosted payload (HoP) operation center (HOC) encrypts unencrypted hosted commands by utilizing a hosted COMSEC variety to produce the encrypted hosted commands;
a hosted communication security module on the hosted payload to decrypt the encrypted hosted commands by utilizing the hosted COMSEC variety to produce unencrypted hosted commands;
a hosted processor on the hosted payload to reconfigure the hosted payload according to the unencrypted hosted commands, wherein the hosted payload comprises the hosted communication security module and the hosted processor;
the hosted payload antenna to transmit hosted user data utilizing at least one of the at least one inband frequency band to a hosted user antenna;
the hosted communication security module to encrypt unencrypted hosted payload telemetry by utilizing the hosted COMSEC variety to produce encrypted hosted payload telemetry; and
the hosted payload antenna to transmit the encrypted hosted payload telemetry utilizing at least one of the at least one inband frequency band;
wherein the HOC decrypts the encrypted hosted payload telemetry by utilizing the hosted COMSEC variety to produce the unencrypted hosted payload telemetry.

2. The system of claim 1, wherein the hosted processor comprises the hosted communication security module as a single unit.

3. The system of claim 1, wherein the hosted communication security module and the hosted processor are two separate units.

4. The system of claim 1, wherein the hosted processor comprises at least one processor.

5. The system of claim 1, wherein the host payload comprises at least one processor.

6. The system of claim 1, wherein the host communication security module comprises more than one communication security module.

7. The system of claim 6, wherein at least one of the communication security modules is a redundant communication security module.

8. The system of claim 1, wherein the hosted communication security module comprises more than one communication security module.

9. The system of claim 8, wherein at least one of the communication security modules is a redundant communication security module.

10. The system of claim 1, wherein the host payload antenna and the hosted payload antenna each comprise at least one radio frequency (RF) antenna.

11. The system of claim 10, wherein the at least one RF antenna is a reflector antenna.

12. The system of claim 10, wherein the at least one RF antenna is a multi-feed array antenna.

13. The system of claim 1, wherein at least one of the host payload or the hosted payload is reconfigured by adjusting at least one of: transponder power, transponder spectrum monitoring, transponder connectivity, transponder gain settings, transponder limiter settings, transponder automatic level control settings, transponder phase settings, internal gain generation, bandwidth for at least one beam, at least one frequency band for at least one of the at least one beam, transponder beamforming settings, effective isotropic radiation power (EIRP) for at least one of the at least one beam, transponder channels, or beam steering.

14. The system of claim 1, wherein the host payload is reconfigured by reconfiguring at least one of: the host payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

15. The system of claim 1, wherein the hosted payload is reconfigured by reconfiguring at least one of: the hosted payload antenna, at least one analog-to-digital converter, at least one digital-to-analog converter, at least one beamformer, at least one digital channelizer, at least one demodulator, at least one modulator, at least one digital switch matrix, at least one digital combiner, or at least one analog switch matrix.

16. The system of claim 1, wherein the vehicle is an airborne vehicle.

17. The system of claim 16, wherein the airborne vehicle is one of a satellite, an aircraft, an unmanned aerial vehicle (UAV), or a space plane.

18. A system for payload operations, the system comprising:
- a command receiver on a vehicle to receive encrypted host commands,
- wherein unencrypted host commands are encrypted by a host satellite operations center (SOC) utilizing a host communication security (COMSEC) variety to produce the encrypted host commands;
- a host communication security module to decrypt the encrypted host commands by utilizing the host COMSEC variety to produce unencrypted host commands, and to transmit the unencrypted host commands to a hosted payload and a host payload;
- the hosted payload configured to be commanded at least one of on or off according to the unencrypted host commands;
- the host payload reconfigured according to the unencrypted host commands, wherein the host payload and the hosted payload are separate from each other;
- a host payload antenna to transmit host user data to a host user antenna;
- the host communication security module to encrypt unencrypted host payload telemetry by utilizing the host COMSEC variety to produce encrypted host payload telemetry;
- the host payload antenna to transmit the encrypted host payload telemetry,
- wherein the host SOC decrypts the encrypted host payload telemetry by utilizing the host COMSEC variety to produce the unencrypted host payload telemetry;
- a hosted payload antenna on the vehicle to receive encrypted hosted commands, wherein the encrypted hosted commands are transmitted utilizing at least one inband frequency band,
- wherein a hosted payload (HoP) operation center (HOC) encrypts unencrypted hosted commands utilizing a hosted COMSEC variety to produce the encrypted hosted commands;
- a hosted communication security module on the hosted payload to decrypt the encrypted hosted commands by utilizing the hosted COMSEC variety to produce unencrypted hosted commands;
- a hosted processor on the hosted payload to reconfigure the hosted payload according to the unencrypted hosted commands, wherein the hosted payload comprises the hosted communication security module and the hosted processor;
- the hosted payload antenna to transmit hosted user data utilizing at least one of the at least one inband frequency band to a hosted user antenna;
- the hosted communication security module to encrypt unencrypted hosted payload telemetry utilizing the hosted COMSEC variety to produce encrypted hosted payload telemetry; and
- the hosted payload antenna to transmit the encrypted hosted payload telemetry utilizing at least one of the at least one inband frequency band;
- wherein the HOC decrypts the encrypted hosted payload telemetry by utilizing the hosted COMSEC variety to produce the unencrypted hosted payload telemetry.

19. A system for payload operations, the system comprising:
- a host payload antenna on a vehicle to receive encrypted host commands,
- wherein unencrypted host commands are encrypted by a host satellite operations center (SOC) utilizing a host communication security (COMSEC) variety to produce the encrypted host commands;
- a host communication security module to decrypt the encrypted host commands by utilizing the host COMSEC variety to produce unencrypted host commands, and to transmit the unencrypted host commands to a hosted payload and a host payload;
- the hosted payload configured to be commanded at least one of on or off according to the unencrypted host commands;
- the host payload reconfigured according to the unencrypted host commands, wherein the host payload and the hosted payload are separate from each other;
- the host payload antenna to transmit host user data to a host user antenna;
- the host communication security module to encrypt unencrypted host payload telemetry by utilizing the host COMSEC variety to produce encrypted host payload telemetry;
- a telemetry transmitter to transmit the encrypted host payload telemetry,
- wherein the host SOC decrypts the encrypted host payload telemetry by utilizing the host COMSEC variety to produce the unencrypted host payload telemetry;
- a hosted payload antenna on the vehicle to receive encrypted hosted commands, wherein the encrypted hosted commands are transmitted utilizing at least one inband frequency band,
- wherein a hosted payload (HoP) operation center (HOC) encrypts unencrypted hosted commands by utilizing a hosted COMSEC variety to produce the encrypted hosted commands;
- a hosted communication security module on the hosted payload to decrypt the encrypted hosted commands by utilizing the hosted COMSEC variety to produce unencrypted hosted commands;
- a hosted processor on the hosted payload to reconfigure the hosted payload according to the unencrypted hosted commands, wherein the hosted payload comprises the hosted communication security module and the hosted processor;

the hosted payload antenna to transmit hosted user data utilizing at least one of the at least one inband frequency band to a hosted user antenna;

the hosted communication security module to encrypt unencrypted hosted payload telemetry to produce encrypted hosted payload telemetry; and the hosted payload antenna to transmit the encrypted hosted payload telemetry utilizing at least one of the at least one inband frequency band;

wherein the HOC decrypts the encrypted hosted payload telemetry by utilizing the hosted COMSEC variety to produce the unencrypted hosted payload telemetry.

20. A system for payload operations, the system comprising:

a host payload antenna on a vehicle to receive encrypted host commands, wherein unencrypted host commands are encrypted by a host satellite operations center (SOC) utilizing a host communication security (COMSEC) variety to produce the encrypted host commands;

a host communication security module to decrypt the encrypted host commands by utilizing the host COMSEC variety to produce unencrypted host commands, and to transmit the unencrypted host commands to a hosted payload and a host payload;

the hosted payload configured to be commanded at least one of on or off according to the unencrypted host commands;

the host payload reconfigured according to the unencrypted host commands, wherein the host payload and the hosted payload are separate from each other;

a host payload antenna to transmit host user data to a host user antenna;

the host communication security module to encrypt unencrypted host payload telemetry utilizing the host COMSEC variety to produce encrypted host payload telemetry;

the host payload antenna to transmit the encrypted host payload telemetry, wherein the host SOC decrypts the encrypted host payload telemetry by utilizing the host COMSEC variety to produce the unencrypted host payload telemetry;

a hosted payload antenna on the vehicle to receive encrypted hosted commands, wherein the encrypted hosted commands are transmitted utilizing at least one inband frequency band, wherein a hosted payload (HoP) operation center (HOC) encrypts unencrypted hosted commands by utilizing a hosted COMSEC variety to produce the encrypted hosted commands;

a hosted communication security module on the hosted payload to decrypt the encrypted hosted commands by utilizing the hosted COMSEC variety to produce unencrypted hosted commands;

a hosted processor on the hosted payload to reconfigure the hosted payload according to the unencrypted hosted commands, wherein the hosted payload comprises the hosted communication security module and the hosted processor;

the hosted payload antenna to transmit hosted user data utilizing at least one of the at least one inband frequency band to a hosted user antenna;

the hosted communication security module to encrypt unencrypted hosted payload telemetry to produce encrypted hosted payload telemetry; and the hosted payload antenna to transmit the encrypted hosted payload telemetry utilizing at least one of the at least one inband frequency band;

wherein the HOC decrypts the encrypted hosted payload telemetry by utilizing the hosted COMSEC variety to produce the unencrypted hosted payload telemetry.

21. The system of claim 1, wherein the hosted payload antenna is further to transmit the hosted user data and the encrypted hosted payload telemetry on a same frequency band.

22. The system of claim 1, wherein the host communication security module and the hosted payload are communicatively coupled together such that there is one-way communication between the host communication security module to the hosted payload.

* * * * *